United States Patent
Iwanaka et al.

(10) Patent No.: US 8,162,084 B2
(45) Date of Patent: Apr. 24, 2012

(54) HYBRID DRIVE DEVICE

(75) Inventors: Makoto Iwanaka, Anjo (JP); Shigeki Takami, Anjo (JP); Nobukazu Ike, Anjo (JP); Hiroaki Sanji, Anjo (JP); Miyoshi Kawaguchi, Anjo (JP); Yukihiko Ideshio, Susono (JP); Shigeru Okuwaki, Gotemba (JP)

(73) Assignees: Aisin AW Co., Ltd., Anjo (JP); Toyota Jodisha Kabushiki Kaisha, Toyota (JP)

( * ) Notice: Subject to any disclaimer, the term of this patent is extended or adjusted under 35 U.S.C. 154(b) by 804 days.

(21) Appl. No.: 12/285,461

(22) Filed: Oct. 6, 2008

(65) Prior Publication Data

US 2009/0093331 A1 Apr. 9, 2009

(30) Foreign Application Priority Data

Oct. 9, 2007 (JP) .................................. 2007-263839

(51) Int. Cl.
B60K 6/365 (2007.10)
(52) U.S. Cl. .................. 180/65.235; 475/5; 903/911
(58) Field of Classification Search .................. 477/3, 4, 477/5, 6; 475/1, 5; 180/65.21, 65.22, 65.235; 903/910, 911
See application file for complete search history.

(56) References Cited

U.S. PATENT DOCUMENTS

| | | | |
|---|---|---|---|
| 5,558,589 A * | 9/1996 | Schmidt | 475/5 |
| 5,931,757 A | 8/1999 | Schmidt | |
| 5,965,035 A | 10/1999 | Hung et al. | |
| 6,491,599 B1 * | 12/2002 | Schmidt | 475/5 |
| 6,540,631 B2 * | 4/2003 | Holmes | 475/5 |
| 6,776,737 B2 * | 8/2004 | Liu | 475/248 |
| 6,932,176 B2 * | 8/2005 | Takami et al. | 180/65.235 |
| 6,991,581 B2 * | 1/2006 | Murakami et al. | 477/3 |
| 7,276,007 B2 * | 10/2007 | Takami et al. | 475/5 |
| 2006/0276288 A1 | 12/2006 | Iwanaka et al. | |
| 2007/0107956 A1 | 5/2007 | Matsubara et al. | |

FOREIGN PATENT DOCUMENTS

| | | |
|---|---|---|
| JP | A-2000-62483 | 2/2000 |
| JP | A-2000-69611 | 3/2000 |
| JP | A-2005-112019 | 4/2005 |
| JP | A-2005-155891 | 6/2005 |
| JP | A-2005-238898 | 9/2005 |
| JP | A-2005-297590 | 10/2005 |
| JP | A-2006-341647 | 12/2006 |
| JP | A-2007-112349 | 5/2007 |

* cited by examiner

*Primary Examiner* — Frank Vanaman
(74) *Attorney, Agent, or Firm* — Oliff & Berridge, PLC

(57) ABSTRACT

A hybrid drive device includes an input member connected to an engine; an output member connected to a wheel; a first rotating electrical machine; a second rotating electrical machine connected to the output member; and a differential gear device including at least four rotational elements. The input member, the output member, and the first rotating electrical machine are respectively connected to different rotational elements of the differential gear device. The output member is capable of selectively connecting to one of two rotational elements of the differential gear device to which neither the input member nor the first rotating electrical machine is connected.

27 Claims, 12 Drawing Sheets

FIG. 3

| ENGAGEMENT ELEMENT / MODE | C1 | C2 | B1 |
|---|---|---|---|
| TORQUE CONVERTER | ○ | | |
| DIRECT CONNECTION | ○ | ○ | |
| TORQUE SPLIT | | ○ | |
| PARALLEL ACCELERATION | | ○ | ○ |
| SERIES | | | ○ |

HYBRID DRIVE DEVICE

INCORPORATION BY REFERENCE

The disclosure of Japanese Patent Application No. 2007-263839 filed on Oct. 9, 2007 including the specification, drawings and abstract is incorporated herein by reference in its entirety.

BACKGROUND

The present invention relates to a hybrid drive device.

In recent years, hybrid vehicles that include an engine and a rotating electrical machine (motor or generator) as drive power sources have attracted attention in order to save energy and because of environmental issues. As a result, various configurations of a hybrid drive device have been proposed. One such example is described in Japanese Patent Application Publication No. JP-A-2005-297590. The hybrid vehicle drive device includes an engine, an output member connected to a wheel, a first rotating electrical machine, a second rotating electrical machine, and a power distribution and integration mechanism that includes a planetary gear device including three or four rotational elements. The device is structured to include a torque converter mode that transmits a rotational driving force amplified with respect to a rotational driving force of the engine to the output member, and a torque split mode that transmits a rotational driving force attenuated with respect to the rotational driving force of the engine to the output member. The modes are switched by switching the engagement or release of a plurality of clutches provided in the power distribution and integration mechanism according to a driving state of a vehicle.

SUMMARY

In the device described above, at least one of the torque converter mode and the torque split mode includes a mode causing a state where none of the first rotating electrical machine and the second rotating electrical machine is connected to the output member and one of the rotating electrical machines is connected to the engine. Therefore, the device described above has problems when driving without requiring the driving force of the engine, such as during regenerative braking or when driving on electric power using only the driving force of the rotating electrical machine in such a mode.

Specifically, during such driving, the device shuts down the operation of the engine and causes the other rotating electrical machine not connected to the engine to generate electricity during the regenerative braking and to perform power running when driving on electric power. However, operating only the other rotating electrical machine in such operations causes a state where the rotational driving force is transmitted also to the engine whereby the engine is rotated. Therefore, regenerative energy transmitted from the output member during the regenerative braking and driving energy generated by the rotating electrical machine when driving on electric power are lost due to the friction resistance inside the engine, thereby causing a decrease in energy efficiency of the device.

In order to suppress the loss of energy due to the friction resistance inside the engine, the other rotating electrical machine connected to the engine can be operated to generate the driving force so as not to rotate the engine. When such an operation is performed, however, although the loss of energy due to the engine can be suppressed, energy is consumed in order to generate the driving force in the other rotating electrical machine connected to the engine. This also causes a decrease in energy efficiency of the device.

In order to solve the problems described above, the present invention provides a hybrid drive device that has a plurality of switchable modes, and that is capable of suppressing energy loss due to the friction resistance inside an engine when driving without requiring the driving force of the engine such as during regenerative braking and when driving on electric power in each mode. The present invention thereby improves the energy efficiency compared with the related art, and is able to achieve various other advantages.

According to one exemplary aspect of the present invention, a hybrid drive device includes an input member connected to an engine; an output member connected to a wheel; a first rotating electrical machine; a second rotating electrical machine connected to the output member; and a differential gear device including at least four rotational elements. The input member, the output member, and the first rotating electrical machine are respectively connected to different rotational elements of the differential gear device. The output member is capable of selectively connecting to one of two rotational elements of the differential gear device to which neither the input member nor the first rotating electrical machine is connected.

According to one exemplary aspect of the present invention, a hybrid drive device includes an input member connected to an engine; an output member connected to a wheel; a first rotating electrical machine; a second rotating electrical machine connected to the output member; and a differential gear device that includes a first rotational element, a second rotational element, a third rotational element, and a fourth rotational element. The first rotating electrical machine is connected to the first rotational element, the input member is connected to the third rotational element, and the output member is capable of selectively connecting to one of the second rotational element and the fourth rotational element.

BRIEF DESCRIPTION OF THE DRAWINGS

Various exemplary aspects of the invention will be described with reference to the drawings, wherein:

FIG. 3 is a diagram showing an operation table according to the first embodiment;

DETAILED DESCRIPTION OF EMBODIMENTS

1. First Embodiment

Figure 1:
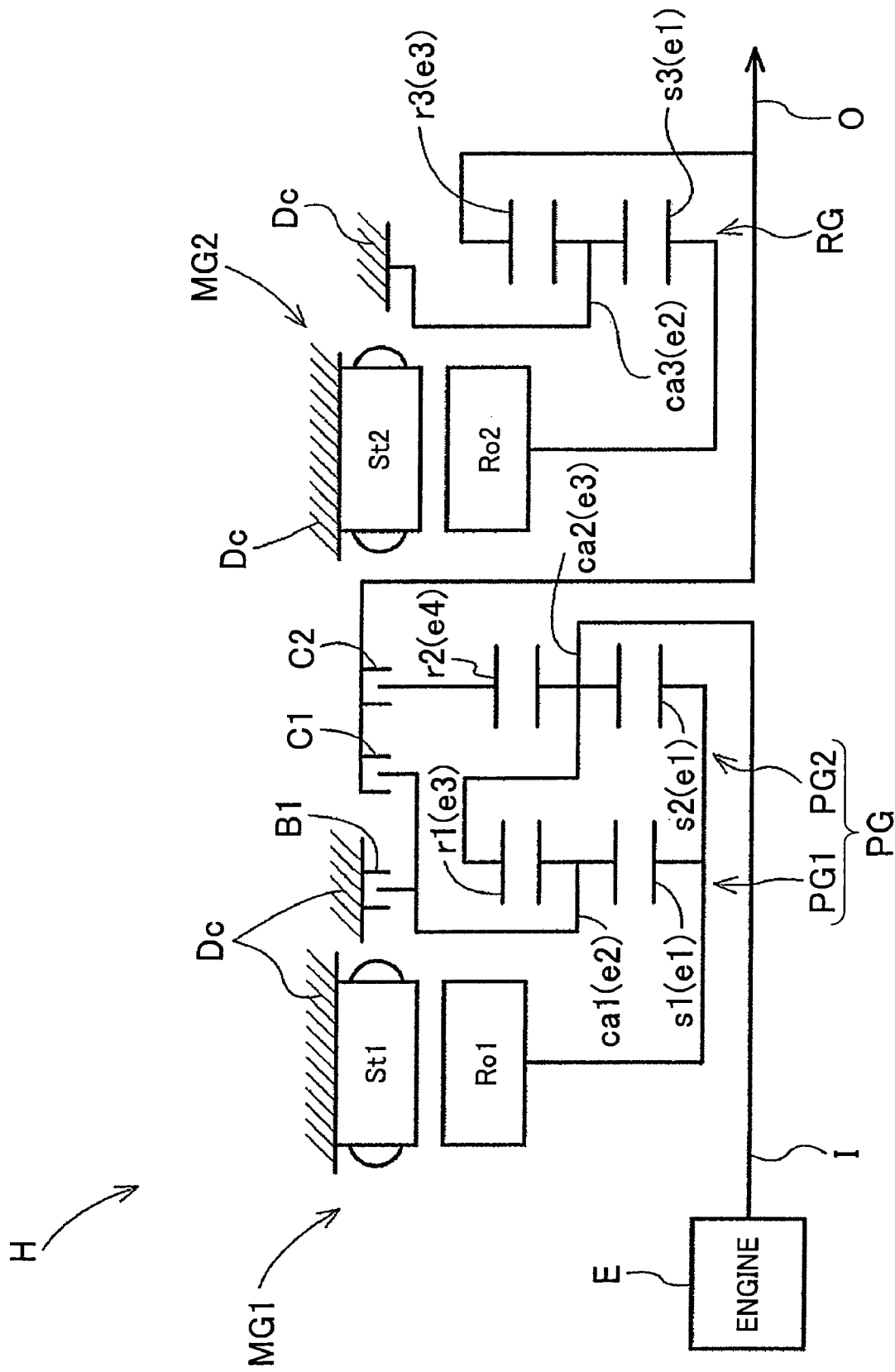
FIG. 1 is a skeleton diagram of a hybrid drive device according to a first embodiment of the present invention.
Figure 2:
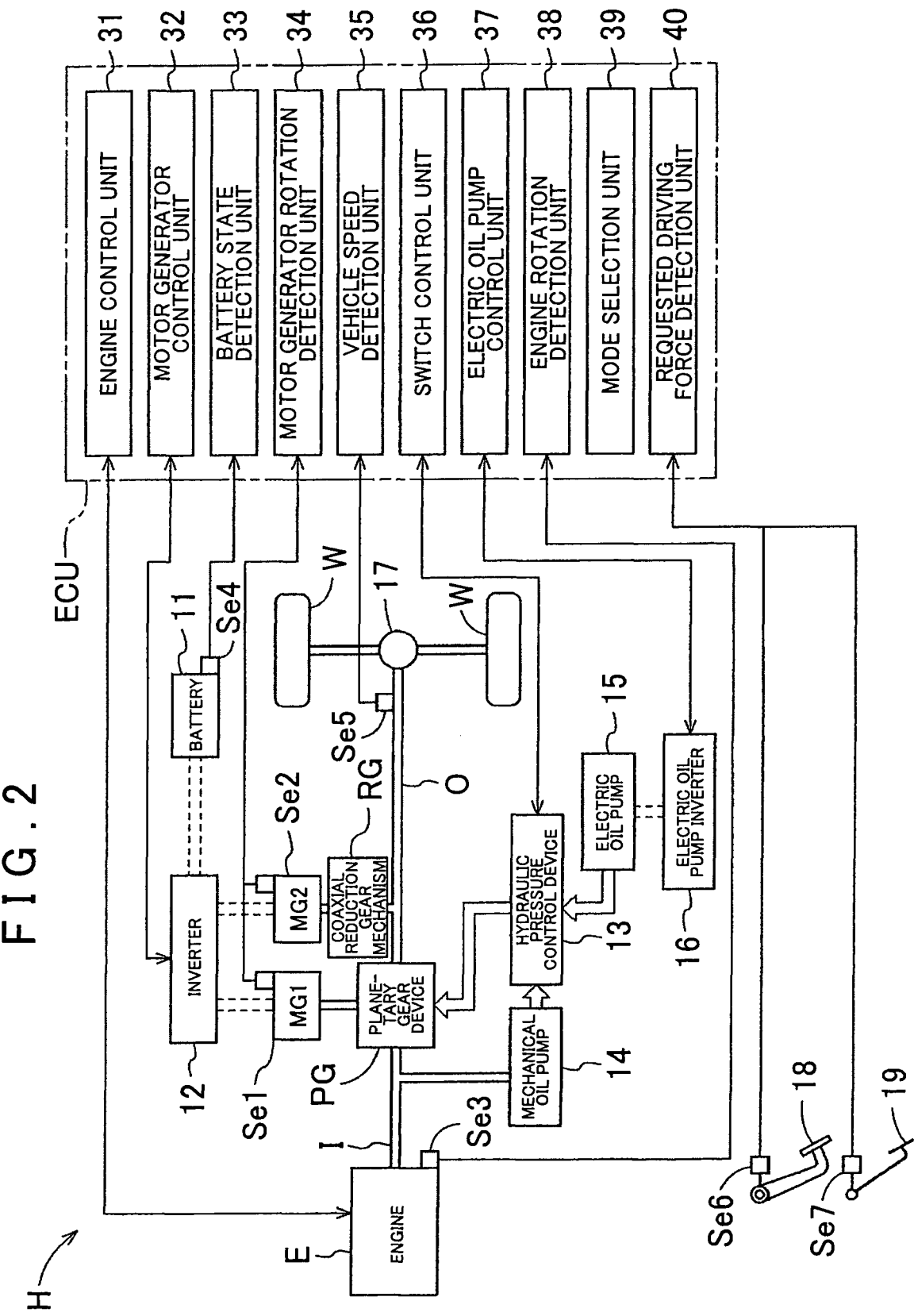
FIG. 2 is a schematic diagram showing the system configuration of the hybrid drive device according to the first embodiment.

First, a first embodiment of the present invention will be described based on the drawings. FIG. 1 is a skeleton diagram showing a configuration of a hybrid drive device H according to this embodiment. Note that the configuration of the lower half that is symmetrical with respect to the center axis is omitted in FIG. 1. FIG. 2 is a schematic diagram showing a system configuration of the hybrid drive device H according to this embodiment. Note that, in FIG. 2, double solid lines show transmission routes of the rotational driving force, double dotted lines show transmission routes of electric power, and white arrows show the flow of hydraulic oil. Solid-line arrows show transmission routes of various pieces of information.

As shown in these drawings, the hybrid drive device H includes an input shaft I connected to an engine E, an output shaft O connected to wheels W, a first motor generator MG1, a second motor generator MG2, and a planetary gear device PG as an example of a differential gear device including at least four rotational elements. In this embodiment, the planetary gear device PG is structured by combining two single-pinion type planetary gear mechanisms PG1 and PG2. The planetary gear device PG is structured such that the input shaft I, the output shaft O, and the first motor generator MG1 are respectively connected to different rotational elements and that the output shaft O can be selectively connected to one of two rotational elements to which neither the input shaft I nor the first motor generator MG1 is connected. The second motor generator MG2 is connected to the output shaft O via a coaxial reduction gear mechanism RG. These elements are stored in a drive device case Dc (hereinafter referred to simply as "case Dc") serving as a non-rotation member fixed to a vehicle body. Note that, in this embodiment, the first motor generator MG1 is an example of a "first rotating electrical machine" of the present invention, and the second motor generator MG2 is an example of a "second rotating electrical machine" of the present invention. The input shaft I is an example of an "input member" of the present invention, and the output shaft O is an example of an "output member" of the present invention.

1-1. Configuration of Components of Hybrid Drive Device

As shown in FIGS. 1 and 2, the input shaft I is connected to the engine E. The engine E is an internal combustion engine driven by combustion of fuel, for which various known engines, e.g., a gasoline engine or a diesel engine, may be used. In this example, the input shaft I is connected integrally with an output rotation shaft such as a crank shaft of the engine E. Note that a configuration in which the input shaft I is connected to the output rotation shaft of the engine E via a damper, a clutch, and the like there between is also preferable. As shown in FIG. 2, the output shaft O is connected to the wheels W so as to be able to transmit the rotational driving force thereto via a differential device 17 and the like. In this example, the input shaft I and the output shaft O are arranged coaxially. This is an arrangement used preferably for a front-engine rear-wheel drive (FR) type vehicle, for example.

As shown in FIG. 1, the first motor generator MG1 includes a stator St1 fixed to the case Dc and a rotor Ro1 rotatably supported inside the stator St1 in a radial direction thereof. The rotor Ro1 of the first motor generator MG1 is connected to rotate integrally with a sun gear s1 of the first planetary gear mechanism PG1 and a sun gear s2 of the second planetary gear mechanism PG2 that form the planetary gear device PG. The second motor generator MG2 includes a stator St2 fixed to the case Dc and a rotor Ro2 rotatably supported inside the stator St2 in a radial direction thereof. The rotor Ro2 of the second motor generator MG2 is connected to rotate integrally with a sun gear s3 of the coaxial reduction gear mechanism RG structured by a planetary gear mechanism. As shown in FIG. 2, the first motor generator MG1 and the second motor generator MG2 are electrically connected to a battery 11 serving as an electric storage device via an inverter 12. Note that the battery 11 is one example of the electric storage device, and it is also possible to use another electric storage device such as a capacitor, or to use a plurality of types of electric storage devices together. The first motor generator MG1 and the second motor generator MG2 are capable of performing a function as a motor (electric motor), which receives a supply of electric power to generate power and a function as a generator (electric generator) that receives a supply of power to generate electric power.

As described later, the first motor generator MG1 functions as a receiver of a reaction force of the rotational driving force of the input shaft I (i.e., the engine E) in two modes of a torque converter mode and a torque split mode as described later. In each of the modes including the two modes, the first motor generator MG1 functions as one of the generator and the motor, depending on the relation of the rotational direction and the direction of the rotational driving force. The second motor generator MG2 mainly functions as the motor in a state where the first motor generator MG1 functions as the generator, and functions as the generator in a state where the first motor generator MG1 functions as the motor. Note that the second motor generator MG2 functions as the generator during regenerative braking for deceleration of the vehicle. In the case of functioning as the generator, the first motor generator MG1 and the second motor generator MG2 supply generated electric power to the battery 11 to charge it, or supply the electric power to the other motor generator MG1, MG2 functioning as the motor, thereby causing it to perform power running. In the case of functioning as the motor, the first motor generator MG1 and the second motor generator MG2 perform power running, with the battery 11 charged, or by receiving the electric power generated by the other motor generator MG1, MG2 functioning as the generator. The operations of the first motor generator MG1 and the second motor generator MG2 are performed through the inverter 12 in accordance with a control instruction from a control device ECU.

In this embodiment, the planetary gear device PG is structured by combining the first planetary gear mechanism PG1 and the second planetary gear mechanism PG2. The planetary gear device PG is an example of a differential gear device of the present invention. The planetary gear device PG includes four rotational elements, and is structured such that the input shaft I, the output shaft O, and the first motor generator MG1 are respectively connected to different rotational elements and that the output shaft O can be selectively connected to one of two rotational elements to which neither the input shaft I nor the first motor generator MG1 is connected. Hereinafter, the configuration of each of the planetary gear mechanisms PG1 and PG2 will be described in detail.

As shown in FIG. 1, the first planetary gear mechanism PG1 is a single-pinion type planetary gear mechanism arranged coaxially with the input shaft I and the output shaft O. That is, the first planetary gear mechanism PG1 includes as the rotational elements a carrier ca1 supporting a plurality of pinion gears, and the sun gear s1 and a ring gear r1 respectively meshing with the pinion gears. The sun gear s1 is connected to rotate integrally with the sun gear s2 of the second planetary gear mechanism PG2 and the rotor Ro1 of the first motor generator MG1. The carrier ca1 is selectively connected to the output shaft O via a first clutch C1, and is selectively fixed to the case Dc by a first brake B1. The ring gear r1 is connected to rotate integrally with a carrier ca2 of the second planetary gear mechanism PG2 and the input shaft I.

The second planetary gear mechanism PG2 is a single-pinion type planetary gear mechanism arranged coaxially with the input shaft I and the output shaft O. That is, the second planetary gear mechanism PG2 includes as the rotational elements the carrier ca2 supporting a plurality of pinion gears, and the sun gear s2 and a ring gear r2 respectively meshing with the pinion gears. The sun gear s2 is connected to rotate integrally with the sun gear s1 of the first planetary gear mechanism PG1 and the rotor Ro1 of the first motor generator MG1. The carrier ca2 is connected to rotate integrally with the ring gear r1 of the first planetary gear mechanism PG1 and the input shaft I. The ring gear r2 is selectively connected to the output shaft O via a second clutch C2.

The planetary gear device PG is structured to include and integrally operate a total of four rotational elements by connecting two of three rotational elements included in each of the first planetary gear mechanism PG1 and the second planetary gear mechanism PG2 to rotate integrally with each other. The four rotational elements are a first rotational element e1, a second rotational element e2, a third rotational element e3, and a fourth rotational element e4 in order of rotational speed. In this embodiment, the sun gear s1 of the first planetary gear mechanism PG1 and the sun gear s2 of the second planetary gear mechanism PG2 which rotate integrally with each other correspond to the first rotational element e1 of the planetary gear device PG. The carrier ca1 of the first planetary gear mechanism PG1 corresponds to the second rotational element e2 of the planetary gear device PG. The ring gear r1 of the first planetary gear mechanism PG1 and the carrier ca2 of the second planetary gear mechanism PG2 which rotate integrally with each other correspond to the third rotational element e3 of the planetary gear device PG. The ring gear r2 of the second planetary gear mechanism PG2 corresponds to the fourth rotational element e4 of the planetary gear device PG.

Thus, the rotor Ro1 of the first motor generator MG1 is connected to rotate integrally with the first rotational element e1 of the planetary gear device PG, and the input shaft I is connected to rotate integrally with the third rotational element e3 of the planetary gear device PG. The output shaft O is structured to be selectively connected to the second rotational element e2 of the planetary gear device PG by the first clutch C1 and selectively connected to the fourth rotational element e4 of the planetary gear device PG by the second clutch C2, thereby being capable of selectively connecting to one of the second rotational element e2 and the fourth rotational element e4 of the planetary gear device PG. The output shaft O can be simultaneously connected to both of the second rotational element e2 and the fourth rotational element e4 of the planetary gear device PG by engaging both of the first clutch C1 and the second clutch C2. Further, the output shaft O can be simultaneously separated from both of the second rotational element e2 and the fourth rotational element e4 of the planetary gear device PG by releasing both of the first clutch C1 and the second clutch C2. Note that the second rotational element e2 of the planetary gear device PG is selectively fixed to the case Dc by the first brake B1 as described above.

The coaxial reduction gear mechanism RG is structured by a single-pinion type planetary gear mechanism arranged coaxially with the input shaft I and the output shaft O. That is, the coaxial reduction gear mechanism RG includes as the rotational elements a carrier ca3 supporting a plurality of pinion gears, and the sun gear s3 and a ring gear r3 respectively meshing with the pinion gears. The sun gear s3 is connected to rotate integrally with the rotor Ro2 of the second motor generator MG2. The carrier ca3 is fixed to the case Dc. The ring gear r3 is connected to rotate integrally with the output shaft O. Accordingly, the second motor generator MG2 is connected to the output shaft O via the coaxial reduction gear mechanism RG. Three rotational elements of the coaxial reduction gear mechanism RG are the first rotational element e1, the second rotational element e2, and the third rotational element e3 in order of rotational speed. The sun gear s3 corresponds to the first rotational element e1, the carrier ca3 corresponds to the second rotational element e2, and the ring gear r3 corresponds to the third rotational element e3. The coaxial reduction gear mechanism RG is set to a gear ratio (i.e., ratio of the number of teeth of the sun gear s3 and the ring gear r3, which equals the number of teeth of the sun gear s3 divided by the number of teeth of the ring gear r3) by which the rotational speed of the sun gear s3 is reduced and transmitted to the ring gear r3 in a state where the carrier ca3 is fixed so as not to rotate. Accordingly, the coaxial reduction gear mechanism RG reduces the rotational speed of the second motor generator MG2 at a certain speed reduction ratio to be transmitted to the output shaft O. In this embodiment, the coaxial reduction gear mechanism RG is an example of a gear mechanism of the present invention.

As described above, the hybrid drive device H includes the first clutch C1, the second clutch C2, and the first brake B1 as friction engagement elements. As the friction engagement elements, a multiple-disc clutch and a multiple-disc brake, both of which operate by hydraulic pressure, may be used. In FIG. 2, the respective friction engagement elements are included in the planetary gear device PG, but are omitted in the drawing. As shown in the drawing, the hydraulic pressure supplied to the friction engagement elements (i.e., the planetary gear device PG) is controlled by a hydraulic pressure control device 13 that operates in accordance with the control instructions from the control device ECU. The supply of the hydraulic oil to the hydraulic pressure control device 13 is performed by a mechanical oil pump 14 while the engine E is in operation, and is performed by an electric oil pump 15 while the engine E is shut down. The mechanical oil pump 14 is driven by the rotational driving force of the input shaft I. The electric oil pump 15 is driven by electric power (the supply route of which is omitted in the drawing) supplied from the battery 11 via an electric oil pump inverter 16.

Note that, as shown in FIG. 1, the rotational elements of the planetary gear device PG connected with the output shaft O by the first clutch C1 and the second clutch C2 are the carrier ca1 of the first planetary gear mechanism PG1 and the ring gear r2 of the second planetary gear mechanism PG2 in this embodiment. Therefore, the first clutch C1 and the second clutch C2 can easily be arranged on the outer circumference side of the planetary gear device PG merely by extending the members that rotate integrally with the carrier ca1 to the outer circumference side of the planetary gear device PG. By arranging the first clutch C1 and the second clutch C2 on the outer circumference side of the planetary gear device PG in this manner, it is possible to shorten the entire length of the hybrid drive device H in the axial direction.

1-2. Configuration of Control System of Hybrid Drive Device

As shown in FIG. 2, the control device ECU uses information acquired by sensors Se1 to Se7 provided in respective portions of the vehicle to perform operation control of the respective friction engagement elements C1, C2, and B1 of the planetary gear device PG (see FIG. 1), the electric oil pump 15, and the like through the engine E, the first motor generator MG1, the second motor generator MG2, and the hydraulic pressure control device 13. As the sensors, in this example, the first motor generator rotation sensor Se1, the second motor generator rotation sensor Se2, the engine rotation sensor Se3, the battery state detection sensor Se4, the vehicle speed sensor Se5, the accelerator operation detection sensor Se6, and the brake operation detection sensor Se7 are provided.

The first motor generator rotation sensor Se1 is a sensor for detecting the rotational speed of the rotor Ro1 of the first motor generator MG1. The second motor generator rotation sensor Se2 is a sensor for detecting the rotational speed of the rotor Ro2 of the second motor generator MG2. The engine rotation sensor Se3 is a sensor for detecting the rotational speed of the output rotation shaft of the engine E. Since the input shaft I rotates integrally with the output rotation shaft of the engine E, the rotational speed of the engine E detected by the engine rotation sensor Se3 coincides with the rotational speed of the input shaft I. The battery state detection sensor Se4 is a sensor for detecting the state such as the amount of charge of the battery 11. The vehicle speed sensor Se5 is a sensor for detecting the rotational speed of the output shaft O for detecting the vehicle speed. The accelerator operation detection sensor Se6 is a sensor for detecting the operated amount of an accelerator pedal 18. The brake operation detection sensor Se7 is a sensor for detecting the operated amount of a brake pedal 19 interlocking with a wheel brake (not shown).

The control device ECU includes an engine control unit 31, a motor generator control unit 32, a battery state detection unit 33, a motor generator rotation detection unit 34, a vehicle speed detection unit 35, a switch control unit 36, an electric oil pump control unit 37, an engine rotation detection unit 38, a mode selection unit 39, and a requested driving force detection unit 40. Each unit in the control device ECU is configured such that a function portion for performing various processes on input data is implemented by one or both of hardware and software (program), with an arithmetic processing device such as a CPU serving as a core member.

The engine control unit 31 performs operation control such as operation initiation, shutdown, rotational speed control, and output torque control of the engine E. The motor generator control unit 32 performs operation control such as rotational speed control and output torque control of the first motor generator MG1 and the second motor generator MG2 through the inverter 12. The battery state detection unit 33 detects the state such as the charge amount of the battery 11 based on the output of the battery state detection sensor Se4. The motor generator rotation detection unit 34 detects the rotational speeds of the first motor generator MG1 and the second motor generator MG2 based on the outputs of the first motor generator rotation sensor Se1 and the second motor generator rotation sensor Se2. The vehicle speed detection unit 35 detects the vehicle speed based on the output from the vehicle speed sensor Se5. The switch control unit 36 controls the operation of the hydraulic pressure control device 13 to perform engagement or release (disengagement) of the respective friction engagement elements C1, C2, and B1 of the hybrid drive device H (see FIG. 1), thereby performing control of switching the operation modes of the hybrid drive device H. The electric oil pump control unit 37 performs operation control of the electric oil pump 15 through the electric oil pump inverter 16. The engine rotation detection unit 38 detects the rotational speeds of the output rotation shaft of the engine E and the input shaft I based on the output from the engine rotation sensor Se3.

The mode selection unit 39 selects an appropriate operation mode according to a predetermined control map depending on a driving condition such as the vehicle speed and the requested driving force. That is, the mode selection unit 39 acquires the information of the vehicle speed from the vehicle speed detection unit 35 and acquires the information of the requested driving force from the requested driving force detection unit 40. The mode selection unit 39 selects the specified operation mode according to the predetermined control map and depending on the acquired vehicle speed and the requested driving force. As the operation mode to be selected, there are five modes of the torque converter mode, a direct connection mode, the torque split mode, a parallel acceleration mode, and a series mode as described later. Note that, as the driving condition to be referenced for mode selection, various conditions such as a battery charge amount, coolant temperature, and oil temperature are preferably used, in addition to the vehicle speed and the requested driving force. The requested driving force detection unit 40 calculates and acquires the requested driving force by the driver based on the output from the accelerator operation detection sensor Se6 and the brake operation detection sensor Se7.

1-3. Operation Mode of Hybrid Drive Device

Figure 4:
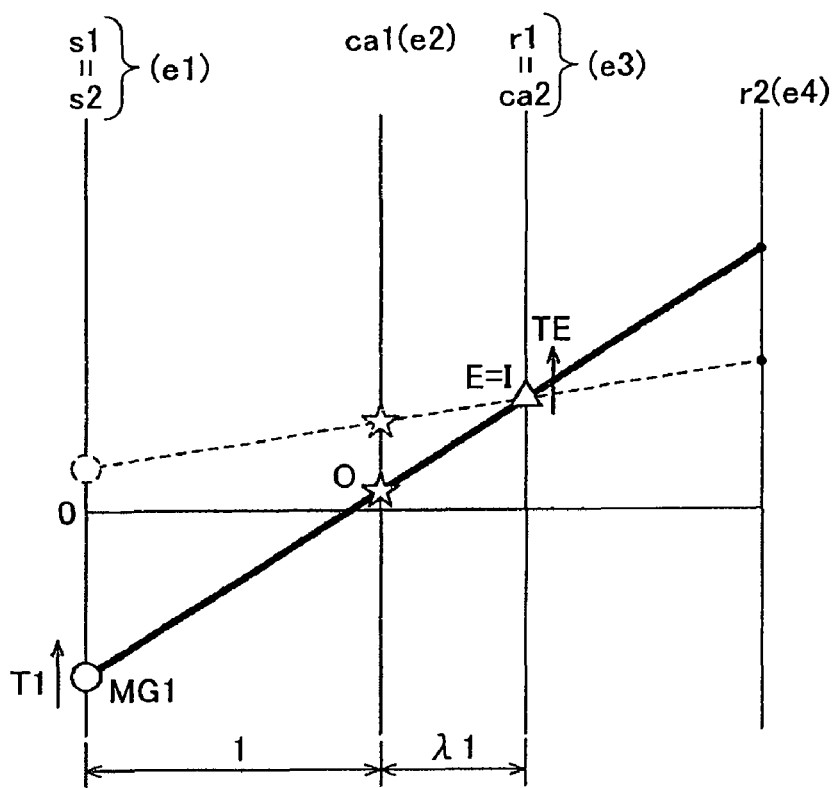
FIG. 4 is a velocity diagram in a torque converter mode according to the first embodiment.
Figure 5:
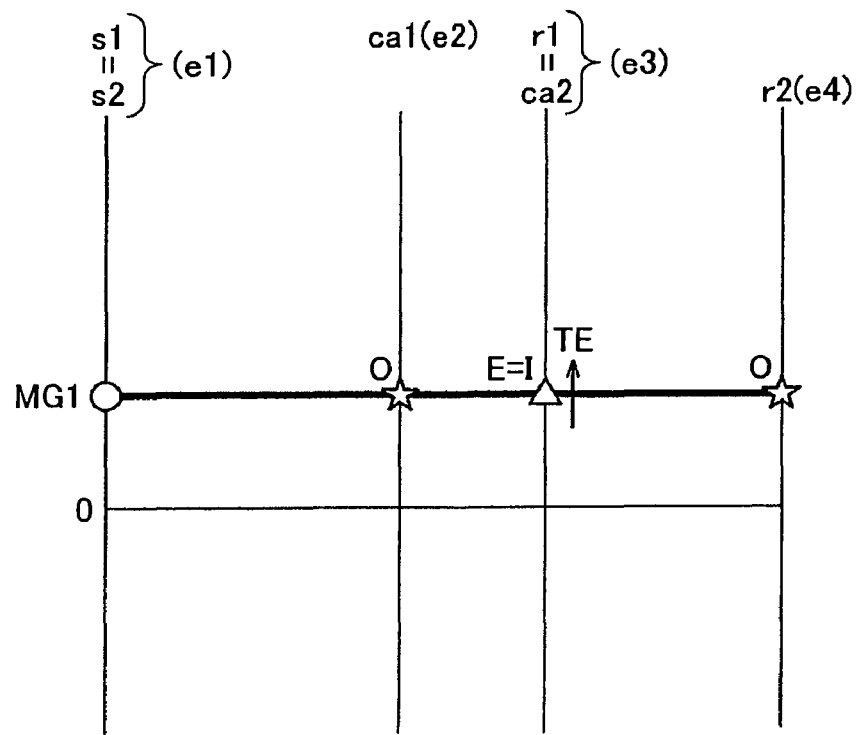
FIG. 5 is a velocity diagram in a direct connection mode according to the first embodiment.
Figure 6:
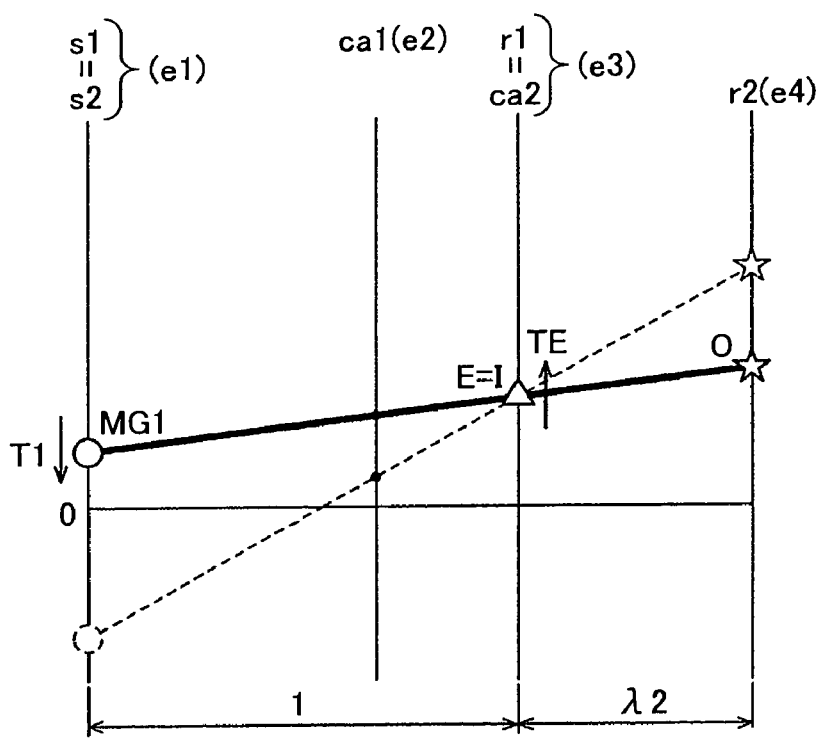
FIG. 6 is a velocity diagram in a torque split mode according to the first embodiment.
Figure 7:
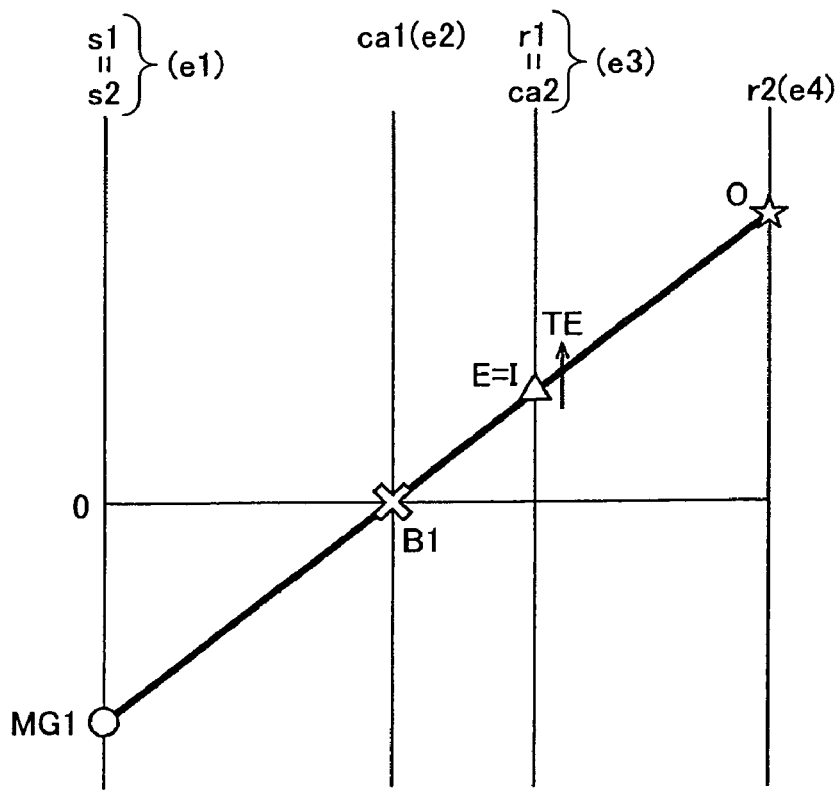
FIG. 7 is a velocity diagram in a parallel acceleration mode according to the first embodiment.
Figure 8:
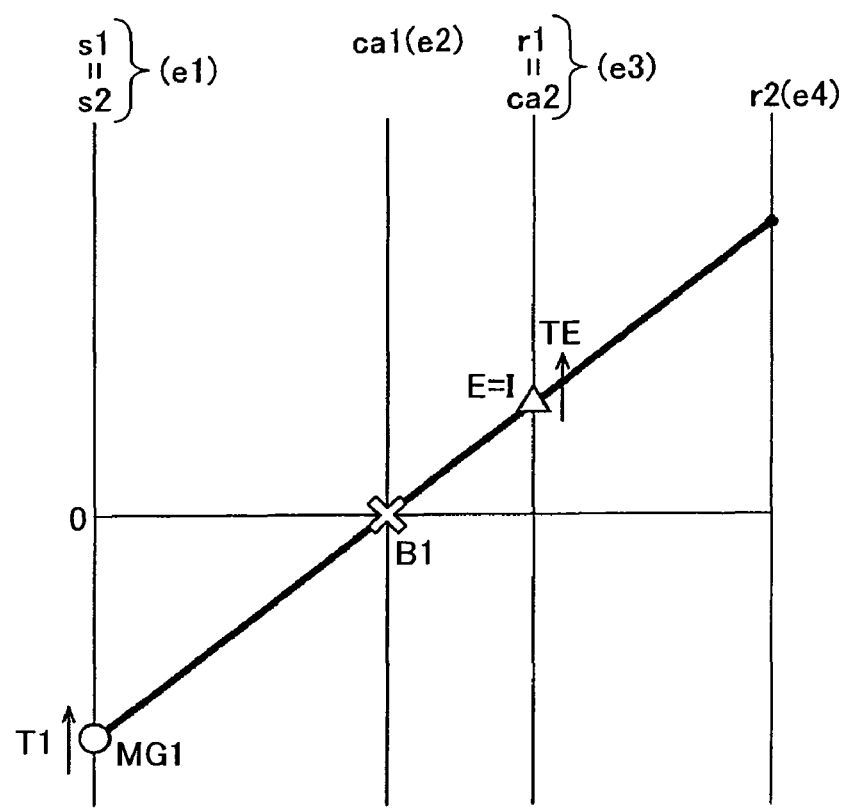
FIG. 8 is a velocity diagram in a series mode according to the first embodiment.
Figure 9:
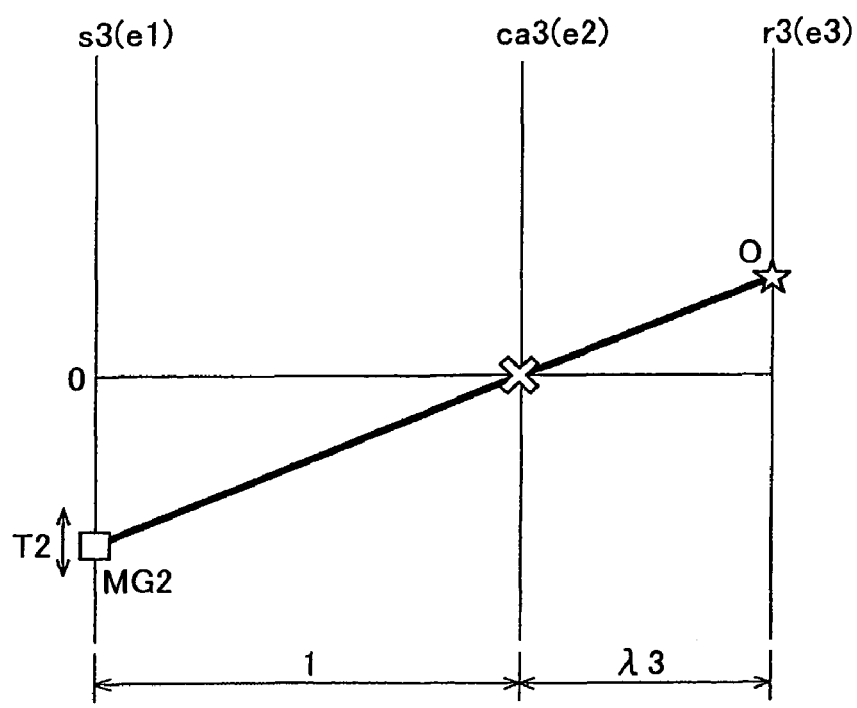
FIG. 9 is a velocity diagram of a coaxial reduction gear mechanism according to the first embodiment.

Next, the operation modes realizable by the hybrid drive device H according to this embodiment will be described. FIG. 3 is an operation table showing the operation states of the plurality of friction engagement elements C1, C2, and B1 in the respective modes. In the drawing, a circle shows that the friction engagement element is in the engaged state, and no mark shows that the friction engagement element is in the released (disengaged) state. FIGS. 4 to 8 show velocity diagrams of the planetary gear device PG. FIG. 4 shows the velocity diagram in the torque converter mode, FIG. 5 shows the velocity diagram in the direct connection mode, FIG. 6 shows the velocity diagram in the torque split mode, FIG. 7 shows the velocity diagram in the parallel acceleration mode, and FIG. 8 shows the velocity diagram in the series mode, respectively. FIG. 9 shows a velocity diagram of the coaxial reduction gear mechanism RG. In the velocity diagrams, the ordinate corresponds to the rotational speed of the respective rotational elements. That is, "0" stated in correspondence with the ordinate shows that the rotational speed is zero, whereby the upper side is positive and the lower side is negative. The plurality of vertical lines arranged in parallel respectively correspond to the respective rotational elements of the first planetary gear mechanism PG1 and the second planetary gear mechanism PG2 that form the planetary gear device PG, and the coaxial reduction gear mechanism RG. That is, "s1," "ca1," and "r1" stated on the upper side of the respective vertical lines respectively correspond to the sun gear s1, the carrier ca1, and the ring gear r1 of the first planetary gear mechanism PG1, "s2," "ca2," and "r2" respectively correspond to the sun gear s2, the carrier ca2, and the ring gear r2 of the second planetary gear mechanism PG2, and "s3," "ca3," and "r3" respectively correspond to the sun gear s3, the carrier ca3, and the ring gear r3 of the planetary gear mechanism that form the coaxial reduction gear mechanism RG.

The intervals of the vertical lines corresponding to the respective rotational elements correspond to respective gear ratios (i.e., ratios of the number of teeth of the sun gear and the ring gear which equal the number of teeth of the sun gear divided by the number of teeth of the ring gear) of the first planetary gear mechanism PG1 and the second planetary gear mechanism PG2 that form the planetary gear device PG, and the coaxial reduction gear mechanism RG. Note that, the gear ratio of the first planetary gear mechanism PG1 is specified as $\lambda 1$ in the lower portion of FIG. 4, the gear ratio of the second planetary gear mechanism PG2 is specified as $\lambda 2$ in the lower portion of FIG. 6, and the gear ratio of the coaxial reduction gear mechanism RG is specified as $\lambda 3$ in the lower portion of FIG. 9. In the velocity diagrams, a triangle shows the rotational speed of the input shaft I (engine E), a star shows the rotational speed of the output shaft O, a circle shows the rotational speed of the first motor generator MG1, a square shows the rotational speed of the second motor generator MG2, and an X shows a fixed state to the case Dc as a non-rotation member, respectively.

As shown in FIGS. 3 to 8, the hybrid drive device H is structured to include five operation modes of the torque converter mode, the direct connection mode, the torque split mode, the parallel acceleration mode, and the series mode to be switchable. The operation mode is selected by the mode selection unit 39, and the switching to the selected operation mode is performed by the respective friction engagement elements C1, C2, and B1 being engaged or released in accordance with the control instructions from the control device ECU. Note that, at this time, the control device ECU also performs control of the rotational speeds and the output torques of the first motor generator MG1 and the second motor generator MG2 by the motor generator control unit 32, control of the rotational speed and the output torque of the engine E by the engine control unit 31, and the like. Hereinafter, the operation state of the hybrid drive device H in the respective operation modes will be described in detail. Note that, since the operation state of the coaxial reduction gear mechanism RG is basically common in all of the modes as shown in FIG. 9, the operation states in the respective modes of the planetary gear device PG will first be described in order, and the operation state of the coaxial reduction gear mechanism RG will be described last.

1-4. Torque Converter Mode

First, the operation state of the planetary gear device PG in the torque converter mode will be described based on FIG. 4. The torque converter mode is a mode of transmitting the rotational driving force amplified with respect to the rotational driving force of the input shaft I to the output shaft O in a state where the output shaft O is connected to one of two rotational elements to which neither the input shaft I nor the first motor generator MG1 is connected in the planetary gear device PG. In this embodiment, as shown in FIG. 3, the first clutch C1 is in the engaged state and the second clutch C2 and the first brake B1 are in the released state in the torque converter mode. Thus, the torque converter mode is realized by connecting the output shaft O to the carrier ca1 of the first planetary gear mechanism PG1 that forms the planetary gear device PG.

FIG. 4 is the velocity diagram of the planetary gear device PG in the torque converter mode. In the drawing, a solid line shows a state where the rotational speed of the output shaft O is low (i.e., the vehicle speed is low), and a dotted line shows a state where the rotational speed of the output shaft O is higher (i.e., the vehicle speed is higher) than in the state of the solid line. As shown in the drawing, the first planetary gear mechanism PG1 that forms the planetary gear device PG is brought to a functioning state in the torque converter mode. That is, in the first planetary gear mechanism PG1, the carrier ca1 in the middle in order of the rotational speed rotates integrally with the output shaft O, the ring gear r1 on one side in order of the rotational speed rotates integrally with the input shaft I (engine E), and the sun gear s1 on the other side in order of the rotational speed rotates integrally with the first motor generator MG1. At this time, the engine E outputs a rotational driving force TE in the positive direction depending on the requested driving force while being controlled to maintain a state where the efficiency is high and the amount of exhaust gas is small (to generally match an optimal fuel consumption characteristic), whereby the rotational driving force TE is transmitted to the ring gear r1 via the input shaft I. The first motor generator MG1 generates a rotational driving force T1 in the positive direction in an entire region of the torque converter mode and functions as a receiver of reaction force of the rotational driving force TE of the input shaft I.

Accordingly, the planetary gear device PG synthesizes the rotational driving force TE of the input shaft I and the rotational driving force T1 of the first motor generator MG1, and transmits the rotational driving force amplified with respect to the rotational driving force TE of the input shaft I to the output shaft O. Specifically, as shown in the lower portion of FIG. 4, in the case where the gear ratio of the first planetary gear mechanism PG1 is $\lambda 1$, ($\lambda 1<1$), the relation of the torque of the ring gear r1 (input shaft I), the torque of the carrier ca1 (output shaft O), and the torque of the sun gear s1 (first motor generator MG1) is shown as $1:(1+\lambda 1):\lambda 1$. Thus, in the case where the gear ratio $\lambda 1=0.5$, for example, a torque of 0.5 times of the torque of the ring gear r1 (input shaft I) is distributed to the sun gear s1 (first motor generator MG1), whereby a torque of about 1.5 times of the rotational torque of the ring gear r1 (input shaft I) is transmitted to the carrier ca1 (output shaft O). Note that the gear ratio $\lambda 1$ of the first planetary gear mechanism PG1 can appropriately be set in consideration of the characteristics of the engine E and the first motor generator MG1, the vehicle weight, and the like.

As described above, the torque converter mode is suitable as a mode for low speed used in a state where the vehicle speed is relatively low, since the rotational driving force TE of the input shaft I (engine E) can be amplified and transmitted to the output shaft O. In this embodiment, the torque converter mode is used from a state where the rotational speed of the output shaft O is zero (when the vehicle is started) to a state where the rotational speed of the output shaft O coincides with the rotational speed of the input shaft I. That is, in the torque converter mode, in the case where the rotational speed of the engine E is constant, the rotational speed of the output shaft O is gradually increased by increasing the rotational speed of the first motor generator MG1 from the state where the rotational speed of the output shaft is zero. In this time, the first motor generator MG1 generates the rotational driving force T1 in the positive direction. Thus, in a state where the rotational speed of the output shaft O is low and the rotational speed of the first motor generator MG1 is negative (the rotational direction is negative) as shown by the solid line in FIG. 4, the first motor generator MG1 generates electricity. In a state where the rotational speed of the output shaft O is increased and the rotational speed of the first motor generator MG1 is positive (the rotational direction is positive) as shown by the dotted line in FIG. 4, the first motor generator MG1 performs power running.

When the rotational speed of the output shaft O is increased to coincide with the rotational speed of the input shaft I, the control device ECU engages the second clutch C2 while maintaining the first clutch C1 in the engaged state. Accordingly, the mode is switched from the torque converter mode to the direct connection mode described later. The mode switching is a synchronous switching in which the engagement members to be engaged at this time on both sides of the second clutch C2 are engaged in a state where the rotational speeds are the same. That is, the mode switching is realized by connecting the output shaft O also to the ring gear r2 of the second planetary gear mechanism PG2, in addition to the carrier ca1 of the first planetary gear mechanism PG1, in a state where the rotational speeds of the output shaft O and the carrier ca1 of the first planetary gear mechanism PG1 and the rotational speed of the ring gear r2 of the second planetary gear mechanism PG2 are the same.

1-5. Direct Connection Mode

Next, the operation state of the planetary gear device PG in the direct connection mode will be described based on FIG. 5. The direct connection mode is a mode in which the input shaft I, the output shaft O, and the first motor generator MG1 rotate at the same speed in a state where the output shaft O is connected to both of the two rotational elements to which neither the input shaft I nor the first motor generator MG1 is connected in the planetary gear device PG. In this embodiment, as shown in FIG. 3, the first clutch C1 and the second clutch C2 are in the engaged state and the first brake B1 is in the released state in the direct connection mode. Thus, the direct connection mode is realized by the output shaft connecting to both of the carrier ca1 of the first planetary gear mechanism PG1 and the ring gear r2 of the second planetary gear mechanism PG2 that form the planetary gear device PG.

FIG. 5 is the velocity diagram of the planetary gear device PG in the direct connection mode. As shown in the drawing, the carrier ca1 of the first planetary gear mechanism PG1 and the ring gear r2 of the second planetary gear mechanism PG2 are connected to rotate integrally via the output shaft O, the first clutch C1, and the second clutch C2 in the direct connection mode. Accordingly, the entire planetary gear device PG, i.e., all of the rotational elements that form the planetary gear device PG rotate integrally. Thus, the input shaft I (engine E), the output shaft O, and the first motor generator MG1 are directly connected to be brought to a state where they rotate integrally at the same speed. At this time, the engine E is controlled so as to output the appropriate rotational speed and the rotational driving force TE depending on the vehicle speed and the requested driving force. The first motor generator MG1 is basically controlled in a state where the rotational driving force is not output while rotating at a rotational speed determined depending on the rotational speed of the input shaft I. In this case, as described later, the second motor generator MG2 is also controlled in a state where the rotational driving force is not output. That is, in the direct connection mode, the first motor generator MG1 and the second motor generator MG2 basically do not function as either the motor or the generator and do not perform power running or electricity generation. Note that, in the case where the rotational driving force of the engine E is insufficient with respect to the requested driving force, one or both of the first motor generator MG1 and the second motor generator MG2 can serve as the motor to perform power running. In the case where the charge amount of the battery 11 is insufficient, one or both of the first motor generator MG1 and the second motor generator MG2 can serve as the generator to generate electricity. Alternatively, it is also possible to cause one of the first motor generator MG1 and the second motor generator MG2 to serve as the generator to generate electricity, and use the electric power obtained by the electricity generation to perform power running of the other one serving as the motor.

In this embodiment, the direct connection mode is used as an intermediate mode when switching between the torque converter mode and the torque split mode. That is, the direct connection mode is realized by bringing both of the first clutch C1 and the second clutch C2 to the engaged state between the torque converter mode realized by a state where the first clutch C1 is engaged and the second clutch C2 is released and the torque split mode realized by a state where the first clutch C1 is released and the second clutch C2 is engaged. By the first clutch C1 and the second clutch C2 being in the engaged state in a state where the rotational speeds of the engagement members on both sides of the first clutch C1 and the second clutch C2 to be engaged at this time are the same, i.e., in a state where the rotational speeds of the carrier ca1 of the first planetary gear mechanism PG1 and the ring gear r2 of the second planetary gear mechanism PG2 that form the planetary gear device PG are the same, the engagement members on both sides of the clutches C1 and C2 are engaged as the synchronous switching in the state where the rotational speeds are the same. By releasing the first clutch C1 in the direct connection mode, the mode is switched to the torque split mode. By releasing the second clutch C2 in the direct connection mode, the mode is switched to the torque converter mode. By using the direct connection mode in this manner, the mode switching between the torque converter mode and the torque split mode can be the synchronous switching in which there is no impact due to the engagement of the first clutch C1 and the second clutch C2.

1-6. Torque Split Mode

Next, the operation state of the planetary gear device PG in the torque split mode will be described based on FIG. 6. The torque split mode is a mode of transmitting the rotational driving force attenuated with respect to the rotational driving force of the input shaft I to the output shaft O in a state where the output shaft O is connected to the other one of the two rotational elements to which neither the input shaft I nor the first motor generator MG1 is connected in the planetary gear device PG. In this embodiment, as shown in FIG. 3, the second clutch C2 is in the engaged state and the first clutch C1 and the first brake B1 are in the released state in the torque split mode. Thus, the torque split mode is realized by connecting the output shaft O to the ring gear r2 of the second planetary gear mechanism PG2 that forms the planetary gear device PG.

FIG. 6 is the velocity diagram of the planetary gear device PG in the torque split mode. In the drawing, a solid line shows a state where the rotational speed of the output shaft O is relatively low (i.e., the vehicle speed is relatively low), and a dotted line shows a state where the rotational speed of the output shaft O is higher (i.e., the vehicle speed is higher) than in the state of the solid line. As shown in the drawing, the second planetary gear mechanism PG2 that forms the planetary gear device PG is brought to a functioning state in the torque split mode. That is, in the second planetary gear mechanism PG2, the carrier ca2 in the middle in order of the rotational speed rotates integrally with the input shaft I (engine E), the ring gear r2 on one side in order of the rotational speed rotates integrally with the output shaft O, and the sun gear s2 on the other side in order of the rotational speed rotates integrally with the first motor generator MG1. At this time, the engine E outputs the rotational driving force TE in the positive direction depending on the requested driving force while being controlled to maintain the state where the efficiency is high and the discharge of gas is low (to generally match the optimal fuel consumption characteristic), whereby the rotational driving force TE is transmitted to the carrier ca2 via the input shaft I. The first motor generator MG1 generates the rotational driving force T1 in the negative direction in an entire region of the torque split mode and functions as the receiver of a reaction force of the rotational driving force TE of the input shaft I.

Accordingly, the planetary gear device PG distributes the rotational driving force TE of the input shaft I to the output shaft O and the first motor generator MG1, and transmits the rotational driving force attenuated with respect to the rotational driving force TE of the input shaft I to the output shaft O. Specifically, as shown in the lower portion of FIG. 6, in the case where the gear ratio of the second planetary gear mechanism PG2 is $\lambda 2$ ($\lambda 2<1$), the relation of the torque of the ring gear r2 (output shaft O), the torque of the carrier ca2 (input shaft I), and the torque of the sun gear s2 (first motor generator MG1) is shown as $1:(1+\lambda 2):\lambda 2$. Thus, in the case where the gear ratio $\lambda 2=0.5$, for example, a torque of ⅓ of the torque of the carrier ca2 (input shaft I) is distributed to the sun gear s2 (first motor generator MG1), whereby a torque of ⅔ of the rotational torque of the carrier ca2 (input shaft I) is transmitted to the ring gear r2 (output shaft O). Note that the gear ratio $\lambda 2$ of the second planetary gear mechanism PG2 can appropriately be set in consideration of the characteristics of the engine E and the first motor generator MG1, the vehicle weight, and the like.

As described above, the torque split mode is suitable as a mode for high speed used in a state where the vehicle speed is relatively high, since the rotational driving force TE of the input shaft I (engine E) can be attenuated and transmitted to the output shaft O. In this embodiment, the torque split mode is used from the state where the rotational speed of the output shaft O and the rotational speed of the input shaft I coincide until when the rotational speed of the output shaft O increases and the rotational speed of the first motor generator MG1 decreases such that the rotational speed of the carrier ca1 of the first planetary gear mechanism PG1 becomes zero. That is, in the torque split mode, in the case where the rotational speed of the engine E is constant, the rotational speed of the output shaft O is gradually increased by decreasing the rotational speed of the first motor generator MG1 from the state where the rotational speed of the output shaft O and the rotational speed of the input shaft I coincide. In this time, the first motor generator MG1 generates the rotational driving force T1 in the negative direction. Thus, in a state where the rotational speed of the output shaft O is relatively low and the rotational speed of the first motor generator MG1 is positive (the rotational direction is positive) as shown by the solid line in FIG. 6, the first motor generator MG1 generates electricity. In a state where the rotational speed of the output shaft O is increased and the rotational speed of the first motor generator MG1 is negative (the rotational direction is negative) as shown by the dotted line in FIG. 6, the first motor generator MG1 performs power running.

When the rotational speed of the output shaft O is increased and the rotational speed of the carrier ca1 of the first planetary gear mechanism PG1 becomes zero, the control device ECU engages the first brake B1 while maintaining the second clutch C2 in the engaged state. Accordingly, it is switched from the torque split mode to the parallel acceleration mode described later. The mode switching is a synchronous switching in which engagement is performed in a state where the rotational speeds of the engagement members on both sides of the first brake B1 to be engaged at this time are the same, i.e., in a state where the rotational speed of the carrier ca1 of the first planetary gear mechanism PG1 is zero.

On the other hand, when the vehicle is decelerated in the torque split mode, the rotational speed of the first motor generator MG1 is gradually increased by the rotational speed of the output shaft O gradually decreasing. When the rotational speeds of the input shaft I, the output shaft O, and the first motor generator MG1 coincide, the control device ECU engages the first clutch C1 while maintaining the second clutch C2 in the engaged state. Accordingly, the mode is switched from the torque split mode to the direct connection mode. The mode switching is a synchronous switching in which the engagement members to be engaged at this time on both sides of the first clutch C1 are engaged in a state where the rotational speeds are the same. That is, the mode switching is realized by connecting the output shaft O also to the carrier ca1 of the first planetary gear mechanism PG1 in addition to the ring gear r2 of the second planetary gear mechanism PG2 in a state where the rotational speeds of the output shaft O and the ring gear r2 of the second planetary gear mechanism PG2 and the rotational speed of the carrier ca1 of the first planetary gear mechanism PG1 are the same.

1-7. Parallel Acceleration Mode

Next, the operation state of the planetary gear device PG in the parallel acceleration mode will be described based on FIG. 7. The parallel acceleration mode is a mode in which the rotational speeds of the first motor generator MG1 and the output shaft O are determined in proportion to the rotational speed of the input shaft I, whereby the rotational speed of the input shaft I is increased to be transmitted to the output shaft O. The parallel acceleration mode is realized in a state where the output shaft O is connected to one of the two rotational elements to which neither the input shaft I nor the first motor generator MG1 is connected in the planetary gear device PG and the other one is fixed to the case Dc. In this embodiment, as shown in FIG. 3, the second clutch C2 and the first brake B1 are in the engaged state and the first clutch C1 is in the released state in the parallel acceleration mode. Thus, the parallel acceleration mode is realized by connecting the output shaft O to the ring gear r2 of the second planetary gear mechanism PG2 that forms the planetary gear device PG and fixing the carrier ca1 of the planetary gear mechanism PG1 to the case Dc.

FIG. 7 is the velocity diagram of the planetary gear device PG in the parallel acceleration mode. As shown in the drawing, the parallel acceleration mode causes a state where the rotational speeds of the output shaft O and the first motor generator MG1 are determined in proportion to the rotational speed of the input shaft I (engine E) by the carrier ca1 of the first planetary gear mechanism PG1 being fixed to the case Dc via the first brake B1. The ring gear r1 and the carrier ca2 (third rotational element e3) are provided as the rotational elements connected to the input shaft I between the carrier ca1 (second rotational element e2) as the rotational element fixed to the case Dc and the ring gear r2 (fourth rotational element e4) as the rotational element connected to the output shaft O in order of the rotational speed, whereby the rotational speed of the input shaft I (engine E) is increased to be transmitted to the output shaft O.

At this time, the engine E is controlled to output the appropriate rotational speed and the rotational driving force TE depending on the vehicle speed and the requested driving force. Note that, as described above, the rotational speed of the input shaft I is increased to be transmitted to the output shaft O in the parallel acceleration mode, whereby the rotational speed of the engine E can be kept low. The first motor generator MG1 is basically controlled in the state where the rotational driving force is not output while rotating at the rotational speed determined depending on the rotational speed of the input shaft I. In this case, as described later, the second motor generator MG2 is also controlled in the state where the rotational driving force is not output. That is, in the parallel acceleration mode, the first motor generator MG1 and the second motor generator MG2 basically do not function as either the motor or the generator and do not perform power running or electricity generation in the same manner as in the direct connection mode. Note that, in the case where the rotational driving force of the engine E is insufficient with respect to the requested driving force, one or both of the first motor generator MG1 and the second motor generator MG2 can serve as the motor to perform power running. In the case where the charge amount of the battery 11 is insufficient, one or both of the first motor generator MG1 and the second motor generator MG2 can serve as the generator to generate electricity. Alternatively, it is also possible to cause one of the first motor generator MG1 and the second motor generator MG2 to serve as the generator to generate electricity, and use the electric power obtained by the electricity generation to perform power running of the other one serving as the motor.

As described above, the parallel acceleration mode is a mode which causes a state where the rotational speed of the input shaft I (engine E) can be increased to be transmitted to the output shaft O and the rotational speed of the output shaft O is determined in proportion to the rotational speed of the input shaft I without requiring the rotational driving force of the first motor generator MG1. Thus, the parallel acceleration mode is suitable as a mode for high-speed cruise used in a state where the vehicle speed is high and the requested driving force is small. That is, in the parallel acceleration mode, the rotational driving force of the input shaft I (engine E) can be transmitted to the output shaft O for driving, without operating the first motor generator MG1 and the second motor generator MG2. Thus, in a situation where the requested driving force is small, the energy loss due to the operation of the first motor generator MG1 and the second motor generator MG2 can be suppressed. Since the rotational speed of the input shaft I (engine E) is increased to be transmitted to the output shaft O at this time, the rotational speed of the input shaft I (engine E) can be kept low, although the rotational driving force of the input shaft I transmitted to the output shaft O is small. Thus, the engine can be operated with high efficiency.

In this embodiment, the parallel acceleration mode is used in a region in which the rotational speed of the output shaft O is higher than in the state of the torque split mode where the rotational speed of the output shaft O increases and the rotational speed of the first motor generator MG1 decreases such that the rotational speed of the carrier ca1 of the first planetary gear mechanism PG1 becomes zero. By releasing the first brake B1 while maintaining the second clutch C2 in the engaged state while driving in the parallel acceleration mode, the mode can be switched to the torque split mode.

1-8. Series Mode

Next, the operation state of the planetary gear device PG in the series mode will be described based on FIG. 8. The series mode is a mode in which the output shaft O is separated from both of the two rotational elements to which neither the input shaft I nor the first motor generator MG1 is connected in the planetary gear device PG, whereby the transmission of the rotational driving force is not performed between the input shaft I as well as the first motor generator MG1 and the output shaft O as well as the second motor generator MG2. In this embodiment, as shown in FIG. 3, the first brake B1 is in the engaged state and the first clutch C1 and the second clutch C2 are in the released state in the series mode. Accordingly, it is brought to a state where the transmission of the rotational driving force is not performed between the planetary gear device PG to which the input shaft I or the first motor generator MG1 is connected and the output shaft O, and further to a state where the rotational driving force can be transmitted between the input shaft I and the first motor generator MG1, whereby the series mode is realized.

FIG. 8 is the velocity diagram of the planetary gear device PG in the series mode. As shown in the drawing, the series mode causes a state where the rotational speed of the first motor generator MG1 is determined in proportion to the rotational speed of the input shaft I (engine E) by the carrier ca1 of the first planetary gear mechanism PG1 being fixed to the case Dc via the first brake B1. In this embodiment, the input shaft I rotates in the positive direction, whereby the first motor generator MG1 rotates in the negative direction (the rotational speed is negative). By the first clutch C1 and the second clutch C2 being in the released state, it is brought to a state where the output shaft O is not connected to any one of the rotational elements of the planetary gear device PG. Thus, the transmission of the rotational driving force is not performed between the planetary gear device PG to which the input shaft I or the first motor generator MG1 is connected and the output shaft O as well as the second motor generator MG2. As described later, the second motor generator MG2 is always connected to the output shaft O via the coaxial reduction gear mechanism RG. Thus, the transmission of the rotational driving force can be performed between the second motor generator MG2 and the output shaft O.

At this time, the engine E outputs the rotational driving force TE in the positive direction depending on the requested driving force required for electricity generation by the first motor generator MG1 while being controlled to maintain the state where the efficiency is high and the amount of exhaust gas is small (to generally match the optimal fuel consumption characteristic). The first motor generator MG1 generates the rotational driving force T1 in the positive direction while being rotated in the negative direction by the rotational driving force TE of the input shaft I to perform electricity generation. Meanwhile, as shown in FIGS. 1 to 9, a rotational driving force T2 of the second motor generator MG2 is transmitted to the output shaft O via the coaxial reduction gear mechanism RG, whereby the output shaft O rotates at a rotational speed in proportion to the rotational speed of the second motor generator MG2. Thus, by supplying the electric power generated by the first motor generator MG1 to the second motor generator MG2 to perform power running, the rotational driving force T2 of the second motor generator MG2 can be transmitted to the output shaft O to drive the vehicle.

At this time, as shown in the velocity diagram of FIG. 9, the vehicle can travel forward by performing power running such that the second motor generator MG2 generates the rotational driving force in the negative direction while rotating in the negative direction. On the other hand, the vehicle can travel backward by performing power running such that the second motor generator MG2 generates the rotational driving force in the positive direction while rotating in the positive direction. In the series mode, the rotational driving force generated by the power running of the second motor generator MG2 can be transmitted to the output shaft O for driving while transmitting the rotational driving force of the engine E to the first motor generator MG1 to perform electricity generation. Thus, regardless of the charged state of the battery 11, it is possible to perform the power running of the second motor generator MG2 over a long period of time with a large rotational driving force to drive the vehicle by the rotational driving force. The series mode is particularly suitable as a mode for reverse travel used when the vehicle travels backward. In a state where there is a surplus amount of charge of the battery 11, it is possible to shut down the engine E in the series mode and perform power running of only the second motor generator MG2 to drive the vehicle (to travel forward or travel backward). In this case, by supplying the electric power stored in the battery 11 to the second motor generator MG2 in a state where the rotational speeds of the input shaft I and the first motor generator MG1 are zero, the rotational driving force T2 obtained by the power running of the second motor generator MG2 is transmitted to the output shaft O to drive the vehicle. This state is a so-called electric vehicle (EV) mode.

1-9. Operation State of Coaxial Reduction Gear Mechanism in Each Mode

Next, the operation state of the coaxial reduction gear mechanism RG in each mode will be described based on the velocity diagram of the coaxial reduction gear mechanism RG shown in FIG. 9. As shown in the drawing, in the coaxial reduction gear mechanism RG structured by the single-pinion type planetary gear mechanism, the carrier ca3 in the middle in order of the rotational speed is fixed to the case Dc, the ring gear r3 on one side in order of the rotational speed rotates integrally with the output shaft O, and the sun gear s3 on the other side in order of the rotational speed rotates integrally with the second motor generator MG2. Thus, the second motor generator MG2 is always in a connected state to the output shaft O via the coaxial reduction gear mechanism RG. The rotational directions of the output shaft O and the second motor generator MG2 are opposite. A gear ratio $\lambda 3$ of the coaxial reduction gear mechanism RG is set to decrease an absolute value of the rotational speed of the sun gear s3 (second motor generator MG2) to be transmitted to the ring gear r3 (output shaft O). Specifically, as shown in the lower portion of FIG. 9, the gear ratio $\lambda 3$ of the coaxial reduction gear mechanism RG is set to be 1 or less. Accordingly, the coaxial reduction gear mechanism RG reduces the rotational speed of the second motor generator MG2 and amplifies the rotational driving force to be transmitted to the output shaft O. That is, the coaxial reduction gear mechanism RG increases the rotational speed of the output shaft O, and attenuates the rotational driving force to be transmitted to the second motor generator MG2.

The second motor generator MG2 basically functions as the motor in the state where the first motor generator MG1 functions as the generator, and functions as the generator in the state where the first motor generator MG1 functions as the motor in each operation mode. That is, the second motor generator MG2 receives the supply of electric power generated by the first motor generator MG1 to perform power running in the state where the first motor generator MG1 functions as the generator. The second motor generator MG2 generates electric power for causing the first motor generator MG1 to perform power running to be supplied to the first motor generator MG1 in the state where the first motor generator MG1 functions as the motor. Note that, in either operation mode, the second motor generator MG2 functions as the generator during regenerative braking for deceleration of the vehicle to perform electricity generation by the rotational driving force transmitted from the output shaft O. As described above, in the case where the first motor generator MG1 does not function as either the motor or the generator in the direct connection mode and the parallel acceleration mode, the second motor generator MG2 can also not function as either the motor or the generator in the same manner. Note that, in the direct connection mode and the parallel acceleration mode, one or both of the first motor generator MG1 and the second motor generator MG2 can serve as the motor to perform power running or serve as the generator to generate electricity. It is also possible to cause one of the first motor generator MG1 and the second motor generator MG2 to serve as the generator to generate electricity, and use the electric power obtained by the electricity generation to perform power running of the other one serving as the motor.

In the hybrid drive device H, the second motor generator MG2 is always connected to the output shaft O via the coaxial reduction gear mechanism RG in all of the operation modes. Therefore, the second motor generator MG2 can perform the transmission of the rotational driving force directly to the output shaft O via only the coaxial reduction gear mechanism RG. Thus, during regenerative braking, for example, the rotational driving force of the output shaft O can directly be transmitted to the second motor generator MG2 to generate electricity. During the electric vehicle (EV) mode in which the vehicle is driven only by the rotational driving force T2 of the second motor generator MG2, the rotational driving force generated by the second motor generator MG2 can be directly transmitted to the output shaft O to drive the vehicle. Thus, when driving without requiring the rotational driving force TE of the engine E, it is possible not to rotate the input shaft I by the rotational driving force transmitted between the second motor generator MG2 and the output shaft O, whereby the energy loss due to the friction resistance inside the engine E can be suppressed. At this time, since it is not necessary to engage the friction engagement elements such as the clutch and the brake for transmission of the rotational driving force between the second motor generator MG2 and the output shaft O, it is also not necessary to operate the pump in order to generate the hydraulic pressure for operating the friction engagement elements. Thus, the energy efficiency of the hybrid drive device H can be improved.

During the regenerative braking for deceleration of the vehicle, the rotational driving force TE of the engine E is not necessary, whereby the engine E is shut down. Thus, in order to suppress the energy loss due to the friction resistance inside the engine E caused by the engine E being rotated by the rotational driving force transmitted from the output shaft O, it is preferable to release both of the first clutch C1 and the second clutch C2 in the same manner as in the series mode. However, in that case, the rotational speed of the engine E becomes zero, whereby it takes time to start the engine E at the next acceleration. Thus, in order to enable the engine E to start promptly after the regenerative braking, it is preferable to perform the regenerative braking with one of the first clutch C1 and the second clutch C2 being kept in the engaged state, i.e., in the torque converter mode or the torque split mode.

2. Second Embodiment

Figure 10:
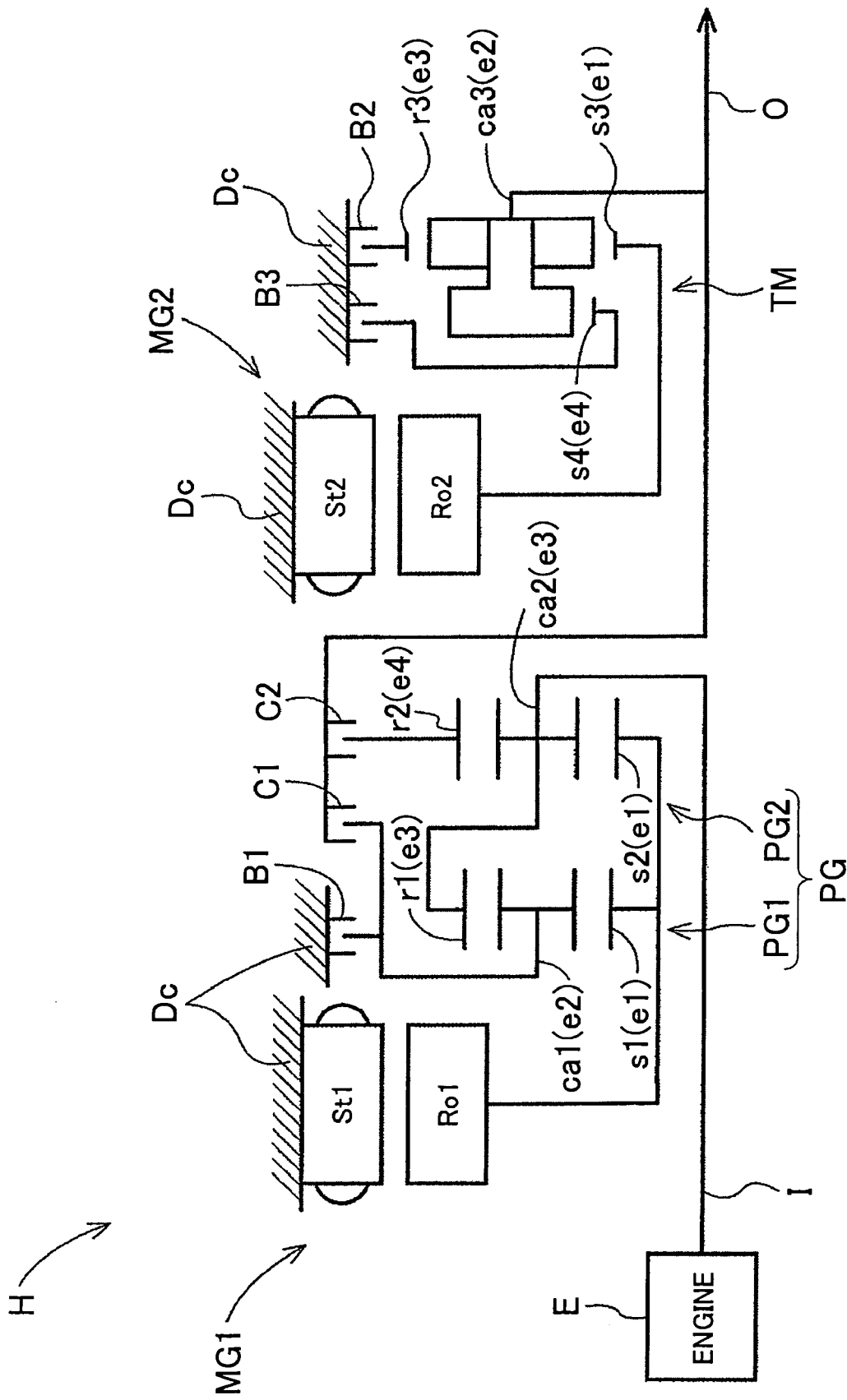
FIG. 10 is a skeleton diagram of a hybrid drive device according to a second embodiment of the present invention.

Next, a second embodiment of the present invention will be described. FIG. 10 is a skeleton diagram showing the configuration of the hybrid drive device H according to this embodiment. Note that the configuration of the lower half that is symmetrical with respect to the center axis is omitted in FIG. 10 in the same manner as in FIG. 1. The hybrid drive device H includes a speed change mechanism TM having a plurality of shift speeds (two shift speeds in this example) instead of the coaxial reduction gear mechanism RG of the first embodiment described above. That is, in the hybrid drive device H, the second motor generator MG2 is connected to the output shaft O via the speed change mechanism TM. The speed change mechanism TM includes a plurality of friction engagement elements B2 and B3 as described later. Thus, in this embodiment, the system configuration of the hybrid drive device H slightly differs from that of the first embodiment described above, and the speed change mechanism TM is provided instead of the coaxial reduction gear mechanism RG of FIG. 2. The hydraulic oil is supplied from the hydraulic pressure control device 13 also to the speed change mechanism TM in addition to the planetary gear device PG. Other configurations are the same as those of the first embodiment described above. Hereinafter, mainly the differences of the hybrid drive device H according to this embodiment from that of the first embodiment described above will be described.

2-1. Configuration of Speed Change Mechanism

The speed change mechanism TM is a differential gear device arranged coaxially with the input shaft I and the output shaft O and including four rotational elements, and is herein structured by a four-element planetary gear device. That is, the speed change mechanism TM includes as the rotational elements two sun gears of the first sun gear s3 and a second sun gear s4, the ring gear r3, and the carrier ca3. The carrier ca3 is structured to rotatably support both of a short pinion gear, which meshes with both of the first sun gear s3 and the ring gear r3, and a stepped long pinion gear, in which a large diameter portion meshes with the second sun gear s4 and a small diameter portion meshes with the short pinion gear. The first sun gear s3 is connected to rotate integrally with the rotor Ro2 of the second motor generator MG2. The carrier ca3 is connected to rotate integrally with the output shaft O. The ring gear r3 is selectively fixed to the case Dc by a second brake B2. The second sun gear s4 is selectively fixed to the case Dc by a third brake B3. Accordingly, the second motor generator MG2 is connected to the output shaft O via the speed change mechanism TM. The four rotational elements of the speed change mechanism TM are the first rotational element e1, the second rotational element e2, the third rotational element e3, and the fourth rotational element e4 in order of the rotational speed. The first sun gear s3 corresponds to the first rotational element e1, the carrier ca3 corresponds to the second rotational element e2, the ring gear r3 corresponds to the third rotational element e3, and the second sun gear s4 corresponds to the fourth rotational element e4. In this embodiment, the speed change mechanism TM is an example of the gear mechanism of the present invention.

2-2. Operation State of Speed Change Mechanism in each Mode

The hybrid drive device H according to this embodiment includes five modes of the torque converter mode, the direct connection mode, the torque split mode, the parallel acceleration mode, and the series mode to be switchable by switching the engagement and release of the first clutch C1, the second clutch C2, and the first brake B1 in the same manner as in the first embodiment described above. The speed change mechanism TM is structured such that the two shift speeds of a low shift speed (Lo) and a high shift speed (Hi) are switchable in the respective modes. Accordingly, the hybrid drive device H is structured to be capable of transmitting to the output shaft O the rotational driving force of the second motor generator MG2 shifted at two different transmission ratios. The shift speeds are selected by the mode selection unit 39, and the switching to the selected shift speed is performed by the respective friction engagement elements B2 and B3 being engaged or released by the control instructions from the control device ECU. Note that, at this time, the control device ECU also performs control and the like of the rotational speed and the output torque of the second motor generator MG2 by the motor generator control unit 32.

Figure 11:
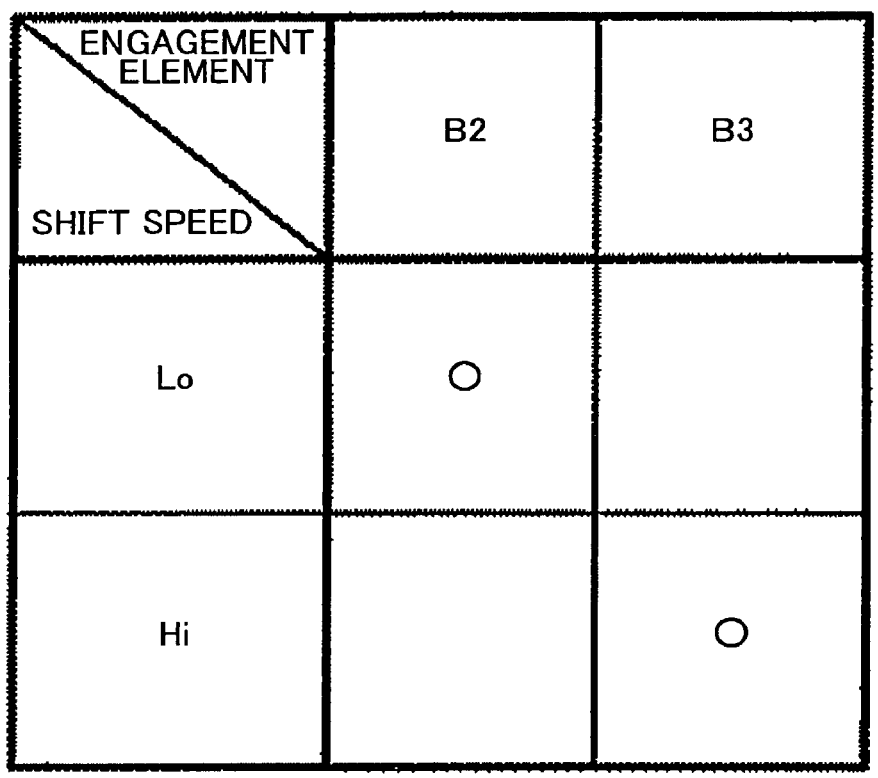
FIG. 11 is a diagram showing an operation table of a speed change mechanism according to the second embodiment.
Figure 12:
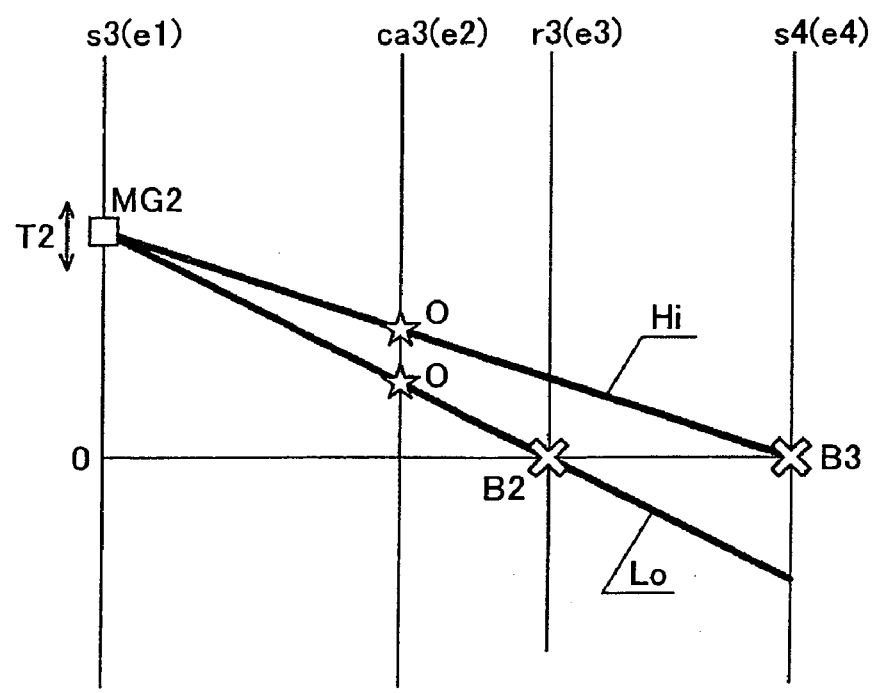
FIG. 12 is a velocity diagram of the speed change mechanism according to the second embodiment.

FIG. 11 is an operation table showing the operation state of the respective friction engagement elements B2 and B3 in the respective shift speeds of the speed change mechanism TM. In the drawing, a circle shows that the friction engagement element is in the engaged state, and no mark shows that the friction engagement element is in the released (disengaged) state. FIG. 12 is a velocity diagram of the speed change mechanism TM. The "s3," "ca3," "r3," and "s4" stated on the upper side of the respective vertical lines of the velocity diagram respectively correspond to the first sun gear s3, the carrier ca3, the ring gear r3, and the second sun gear s4 of the speed change mechanism TM. The intervals of the vertical lines corresponding to the respective rotational elements correspond to the gear ratios of the speed change mechanism TM. In the velocity diagram, a star mark shows the rotational speed of the output shaft O, a square mark shows the rotational speed of the second motor generator MG2, an X mark shows the fixed state of the second brake B2 or the third brake B3 to the case Dc as the non-rotation member, respectively. In FIG. 12, a line Lo and a line Hi respectively show the operation states of the speed change mechanism TM in the low shift speed (Lo) and the high shift speed (Hi).

As shown in FIG. 11, in the speed change mechanism TM, the second brake B2 is in the engaged state in the low shift speed (Lo). Accordingly, as shown by the line Lo in FIG. 12, the ring gear r3 of the speed change mechanism TM is fixed to the case Dc, whereby the rotational speed of the second motor generator MG2 is reduced to be transmitted to the output shaft O. Meanwhile, as shown in FIG. 11, in the speed change mechanism TM, the third brake B3 is in the engaged state in the high shift speed (Hi). Accordingly, as shown by the line Hi in FIG. 12, the second sun gear s4 is fixed to the case Dc, whereby the rotational speed of the second motor generator MG2 is reduced to be transmitted to the output shaft O. Since it is structured such that the third rotational element e3 of the speed change mechanism TM is fixed to the case Dc in the low shift speed (Lo) and the fourth rotational element e4 of the speed change mechanism TM is fixed to the case Dc in the high shift speed (Hi), the transmission ratio (speed reduction ratio) in the low shift speed (Lo) is larger than the transmission ratio in the high shift speed (Hi). Accordingly, the speed change mechanism TM reduces the rotational speed of the second motor generator MG2 depending on the respective transmission ratios of the low shift speed (Lo) and the high shift speed (Hi), and amplifies the rotational driving force depending on the respective transmission ratios to be transmitted to the output shaft O. That is, the speed change mechanism TM increases the rotational speed of the output shaft O depending on the respective transmission ratios of the low shift speed (Lo) and the high shift speed (Hi), and attenuates the rotational driving force depending on the respective transmission ratios to be transmitted to the second motor generator MG2. In this manner, the hybrid drive device H according to this embodiment is structured to be capable of transmitting the rotational driving force of the second motor generator MG2 shifted at the plurality of transmission ratios to the output shaft O by including the speed change mechanism TM. Thus, in a wide range of the vehicle speed (rotational speed of the output shaft O), the rotational driving force of the second motor generator MG2 can appropriately be transmitted to the output shaft O to drive the vehicle.

In the hybrid drive device H according to this embodiment, the second motor generator MG2 can selectively be separated from the output shaft O by bringing both of the second brake B2 and the third brake B3 of the speed change mechanism TM to the released state. That is, in the state where the second brake B2 and the third brake B3 are both released, the transmission of the rotational driving force between the output shaft O and the second motor generator MG2 is not performed. Thus, for example, in the case where the second motor generator MG2 performs neither power running nor electricity generation in the direct connection mode or the parallel acceleration mode, the second motor generator MG2 can be separated from the output shaft O. Accordingly, the energy loss caused by the second motor generator MG2 being rotated by the rotational driving force of the output shaft O can be suppressed.

In this embodiment, the second motor generator MG2 functions in the same manner as in the first embodiment described above. In the hybrid drive device H, the second motor generator MG2 is connected to the output shaft O via the speed change mechanism TM in all of the operation modes unless both of the second brake B2 and the third brake B3 are released. Therefore, the second motor generator MG2 can perform the transmission of the rotational driving force directly to the output shaft O via only the speed change mechanism TM. Thus, in the same manner as in the first embodiment described above, when driving without requiring the rotational driving force TE of the engine E such as during regenerative braking or the electric vehicle (EV) mode, for example, it is possible not to rotate the input shaft I by the rotational driving force transmitted between the second motor generator MG2 and the output shaft O, whereby the energy loss due to the friction resistance inside the engine E can be suppressed. Thus, the energy efficiency of the hybrid drive device H can be improved.

3. Third Embodiment

Figure 13:
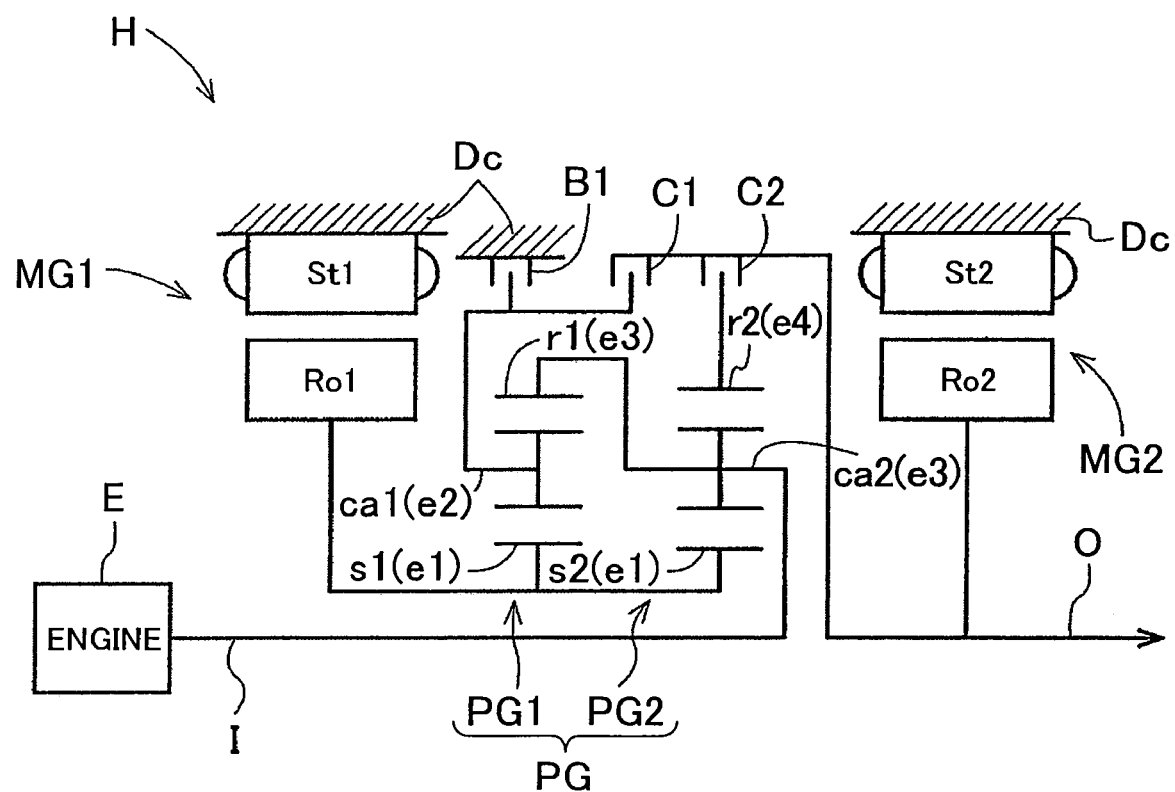
FIG. 13 is a skeleton diagram of a hybrid drive device according to a third embodiment of the present invention.

Next, a third embodiment of the present invention will be described. FIG. 13 is a skeleton diagram showing the configuration of the hybrid drive device H according to this embodiment. Note that the configuration of the lower half that is symmetrical with respect to the center axis is omitted in FIG. 13 in the same manner as in FIG. 1. The hybrid drive device H does not include the coaxial reduction gear mechanism RG or the speed change mechanism TM between the second motor generator MG2 and the output shaft O as in the first and second embodiments described above, and is structured such that the second motor generator MG2 and the output shaft O are directly connected. Thus, in the hybrid drive device H according to this embodiment, the rotational speed of the second motor generator MG2 always coincides with the rotational speed of the output shaft O. Other configurations are the same as those of the first embodiment described above.

4. Fourth Embodiment

Figure 14:
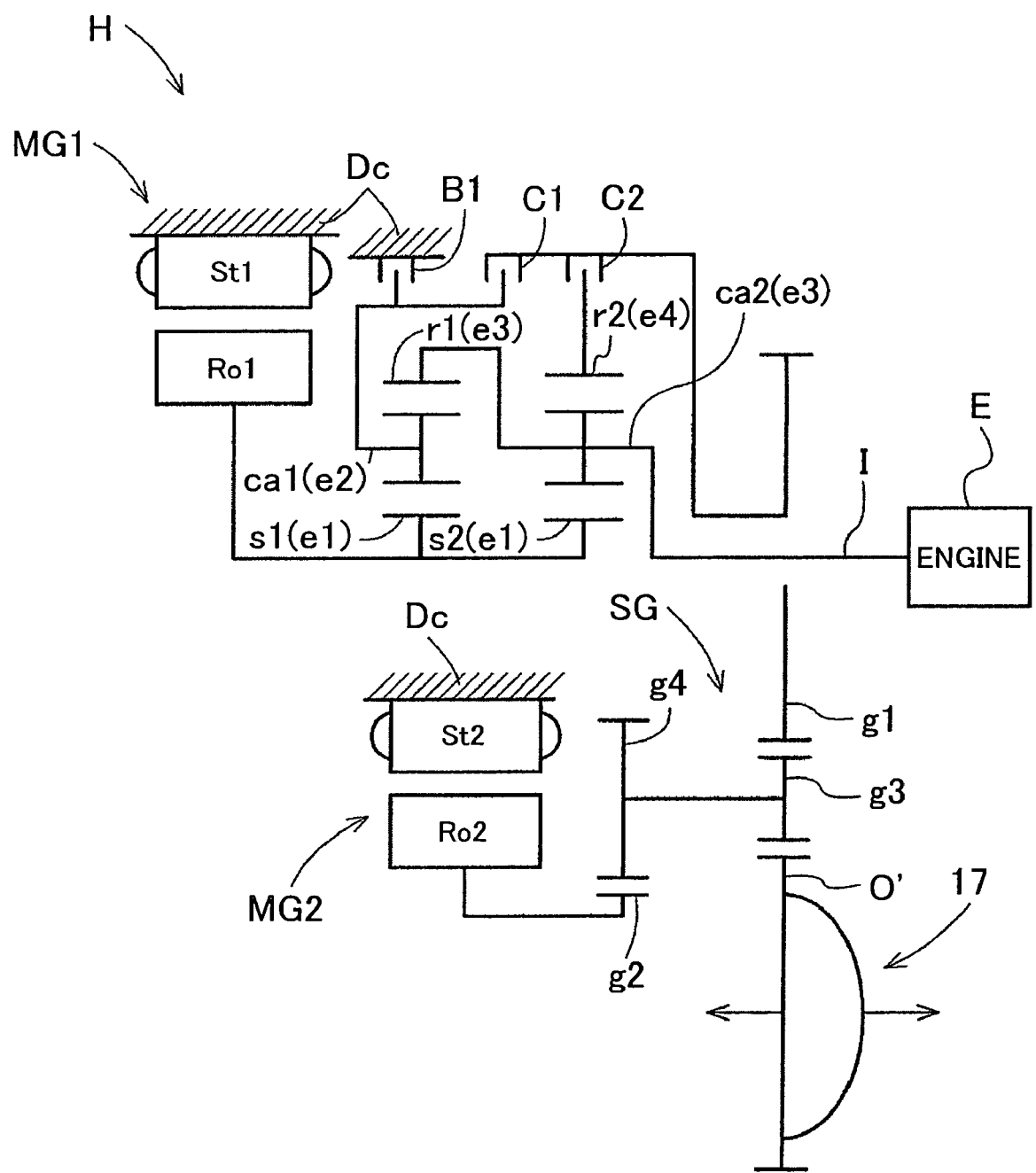
FIG. 14 is a skeleton diagram of a hybrid drive device according to a fourth embodiment of the present invention.

Next, a fourth embodiment of the present invention will be described. FIG. 14 is a skeleton diagram showing the configuration of the hybrid drive device H according to this embodiment. Note that the configuration of the lower half that is symmetrical with respect to the input shaft I is omitted in FIG. 14. The hybrid drive device H includes a counter reduction gear mechanism SG instead of the coaxial reduction gear mechanism RG of the first embodiment described above. The hybrid drive device H also has a four-axis structure arrangement in which a first axis on which the input shaft I and the first motor generator MG1 are arranged, a second axis on which the second motor generator MG2 is arranged, a third axis on which the counter reduction gear mechanism SG is arranged, and a fourth axis on which the differential device 17 is arranged are arranged to be parallel with each other. This is an arrangement preferably used for a front-engine front-wheel drive (FF) type vehicle and a rear-engine rear-wheel drive (RR) type vehicle, for example. In the hybrid drive device H, the second motor generator MG2 is connected to a differential ring gear O' as the output member via the counter reduction gear mechanism SG. Other configurations are the same as those of the first embodiment described above. Hereinafter, mainly the differences of the hybrid drive device H according to this embodiment from that of the first embodiment described above will be described.

In this embodiment, the output rotation from the planetary gear device PG as the differential gear device is transmitted to a differential output gear g1 provided coaxially with the input shaft I. The differential output gear g1 is selectively connected to the carrier ca1 of the first planetary gear mechanism PG1 via the first clutch C1, and is selectively connected to the ring gear r2 of the second planetary gear mechanism PG2 via the second clutch C2, in the same manner as the output shaft O in the first embodiment described above. The rotational driving force of the differential output gear g1 is transmitted to the differential ring gear O' of the differential device 17 via a first counter gear g3 of the counter reduction gear mechanism SG.

The counter reduction gear mechanism SG includes the first counter gear g3 and a second counter gear g4 connected to rotate integrally by a shaft. As described above, the first counter gear g3 is provided to mesh with the differential output gear g1 and to mesh with the differential ring gear O' of the differential device 17. The second counter gear g4 is provided to mesh with a second motor generator output gear g2 which rotates integrally with the rotor Ro2 of the second motor generator MG2. The first counter gear g3 has a smaller diameter than the second counter gear g4. Accordingly, the counter reduction gear mechanism SG reduces the rotational speed of the second motor generator output gear g2 to be transmitted to the differential ring gear O'. Thus, the counter reduction gear mechanism SG reduces the rotational speed of the second motor generator MG2 and amplifies the rotational driving force to be transmitted to the differential ring gear O' as the output member. That is, the counter reduction gear mechanism SG increases the rotational speed of the differential ring gear O' and attenuates the rotational driving force to be transmitted to the second motor generator MG2. In this embodiment, the counter reduction gear mechanism SG is an example of the gear mechanism of the present invention.

5. Fifth Embodiment

Figure 15:
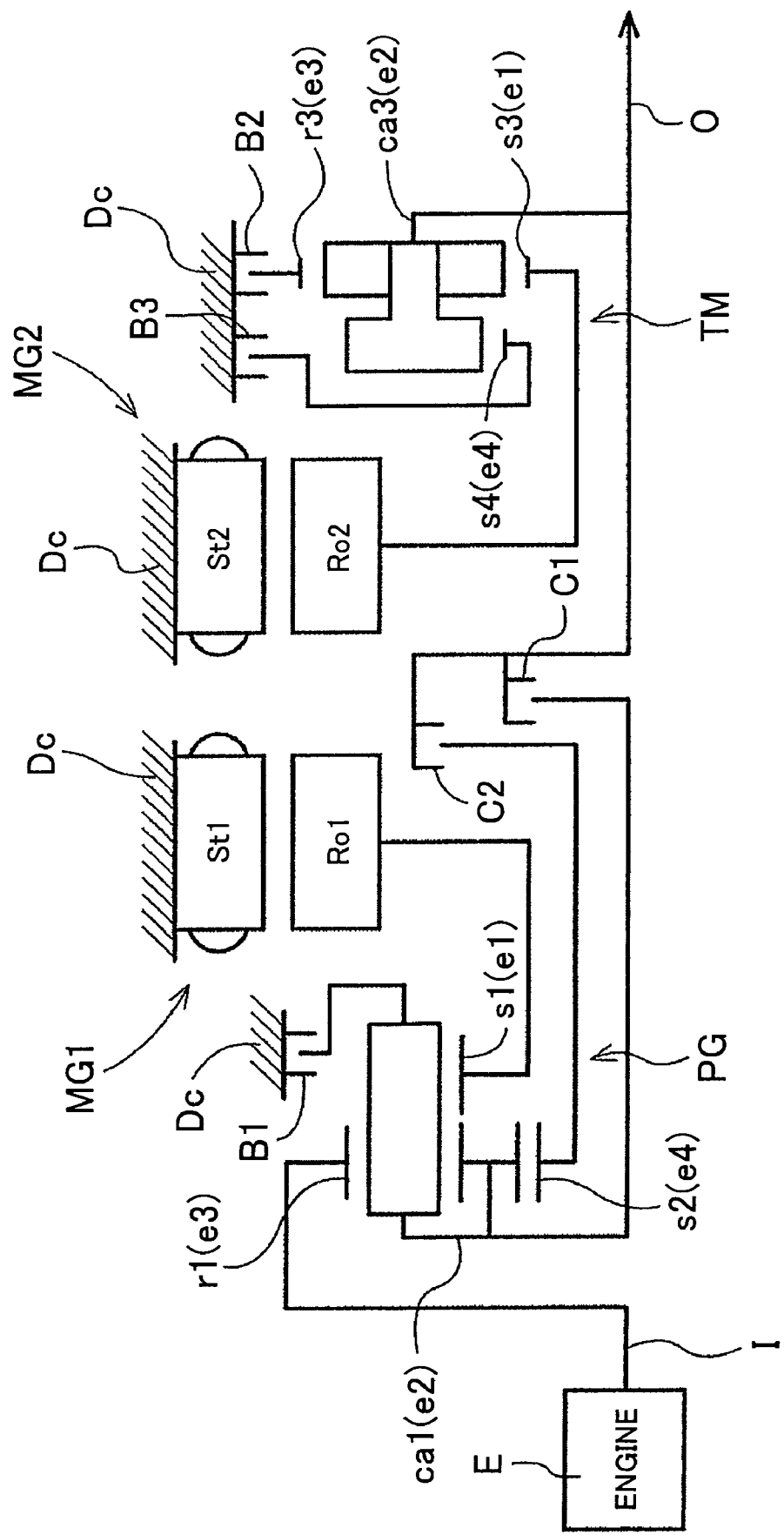
FIG. 15 is a skeleton diagram of a hybrid drive device according to a fifth embodiment of the present invention.

Next, a fifth embodiment of the present invention will be described. FIG. 15 is a skeleton diagram showing the configuration of the hybrid drive device H according to this embodiment. Note that the configuration of the lower half that is symmetrical with respect to the center axis is omitted in FIG. 15 in the same manner as in FIG. 10. The specific configuration of the planetary gear device PG as the differential gear device in the hybrid drive device H differs from those of the first to fourth embodiments described above, and the differential gear device is structured by the Ravigneaux-type planetary gear device PG. Note that, in this embodiment, the second motor generator MG2 is connected to the output shaft O via the speed change mechanism TM in the same manner as in the second embodiment described above. Other configurations are the same as the configurations (including configurations of the first embodiment common with the second embodiment) of the second embodiment described above. Hereinafter, mainly the differences of the hybrid drive device H according to this embodiment from that of the second embodiment described above will be described.

5-1. Configuration of Differential Gear Device

In this embodiment, the differential gear device is structured by the Ravigneaux-type planetary gear device PG arranged coaxially with the input shaft I and the output shaft O. The Ravigneaux-type planetary gear device PG is structured such that the carrier and the ring gear are shared by one set of a single-pinion type planetary gear mechanism and one set of a double-pinion type planetary gear device. That is, the planetary gear device PG according to this embodiment includes four rotational elements of two sun gears, i.e., the first sun gear s1 and the second sun gear s2, the ring gear r1, and the carrier ca1 which commonly supports a long pinion gear meshing with both of the first sun gear s1 and the ring gear r1 and a short pinion gear meshing with the long pinion gear and the second sun gear s2. The planetary gear device PG is structured such that the input shaft I, the output shaft O, and the first motor generator MG1 are respectively connected to different rotational elements, and the output shaft O can be selectively connected to one of the two rotational elements to which neither the input shaft I nor the first motor generator MG1 is connected. That is, the first sun gear s1 is connected to rotate integrally with the rotor Ro1 of the first motor generator MG1. The carrier ca1 is selectively connected to the output shaft O via the first clutch C1, and is selectively fixed to the case Dc by a first brake B1. The ring gear r1 is connected to rotate integrally with the input shaft I. The second sun gear s2 is selectively connected to the output shaft O via the second clutch C2.

The four rotational elements of the planetary gear device PG are the first rotational element e1, the second rotational element e2, the third rotational element e3, and the fourth rotational element e4 in order of the rotational speed. In this embodiment, the first sun gear s1 corresponds to the first rotational element e1, the carrier ca1 corresponds to the second rotational element e2, the ring gear r1 corresponds to the third rotational element e3, and the second sun gear s2 corresponds to the fourth rotational element e4. Thus, the rotor Ro1 of the first motor generator MG1 is connected to rotate integrally with the first rotational element e1 of the planetary gear device PG, and the input shaft I is connected to rotate integrally with the third rotational element e3 of the planetary gear device PG. The output shaft O is structured to be selectively connected to the second rotational element e2 of the planetary gear device PG by the first clutch C1 and selectively connected to the fourth rotational element e4 of the planetary gear device PG by the second clutch C2, thereby being capable of selectively connecting to one of the second rotational element e2 and the fourth rotational element e4 of the planetary gear device PG. The output shaft O can be simultaneously connected to both of the second rotational element e2 and the fourth rotational element e4 of the planetary gear device PG by engaging both of the first clutch C1 and the second clutch C2. Further, the output shaft O can be simultaneously separated from both of the second rotational element e2 and the fourth rotational element e4 of the planetary gear device PG by releasing both of the first clutch C1 and the second clutch C2. Note that the second rotational element e2 of the planetary gear device PG is selectively fixed to the case Dc by the first brake B1 as described above.

Note that, as described above, the differential gear device is the Ravigneaux-type planetary gear device PG in this embodiment. Accordingly, the number of parts of the planetary gear device PG can be reduced by one ring gear, as compared to the case where the differential gear device is structured by combining two planetary gear mechanisms respectively including three rotational elements of the sun gear, the carrier, and the ring gear. By employing the Ravigneaux-type planetary gear device PG in this manner, the entire length of the planetary gear device PG can be shortened, as compared to the case where two planetary gear mechanisms are combined. Thus, the entire length of the hybrid drive device H in the axial direction can be shortened correspondingly.

5-2. Operation Mode of Hybrid Drive Device

The hybrid drive device H according to this embodiment includes five modes of the torque converter mode, the direct connection mode, the torque split mode, the parallel acceleration mode, and the series mode to be switchable by switching the engagement and release of the first clutch C1, the second clutch C2, and the first brake B1 in the same manner as in the second embodiment described above. The operation table of the respective friction engagement elements C1, C2, and B1 in the respective operation modes is the same as FIG. 3 according to the first embodiment described above. The operation states of the planetary gear device PG in the respective operation modes are the same as the operation states shown in the velocity diagrams shown in FIGS. 4 to 8 according to the first embodiment described above. Note that, in this embodiment, as described above, the specific configurations of the first rotational element e1, the second rotational element e2, the third rotational element e3, and the fourth rotational element e4 differ from those of the first embodiment (and the second embodiment) described above. Thus, the specific contents of the respective rotational elements corresponding to the respective vertical lines are changed also in the velocity diagrams shown in FIGS. 4 to 8. That is, when FIGS. 4 to 8 are applied to this embodiment, "s1" of the first sun gear s1 corresponding to the first rotational element e1, "ca1" of the carrier ca1 corresponding to the second rotational element e2, "r1" of the ring gear r1 corresponding to the third rotational element e3, and "s2" of the second sun gear s2 corresponding to the fourth rotational element e4 are to be stated respectively in order from the vertical line on the left side on the upper side of the four vertical lines in the respective velocity diagrams.

In the same manner as in the second embodiment, the speed change mechanism TM is structured such that the two shift speeds of the low shift speed (Lo) and the high shift speed (Hi) are switchable in each of the five modes described above. The operation table of the respective friction engagement elements B2 and B3 in the respective shift speeds is the same as FIG. 11 according to the second embodiment described above. The operation states of the speed change mechanism TM in the respective shift speeds are the same as the operation states shown in the velocity diagram shown in FIG. 12 according to the second embodiment described above. Accordingly, the hybrid drive device H is structured to be capable of transmitting to the output shaft O the rotational driving force of the second motor generator MG2 shifted at the two different transmission ratios.

6. Sixth Embodiment

Figure 16:
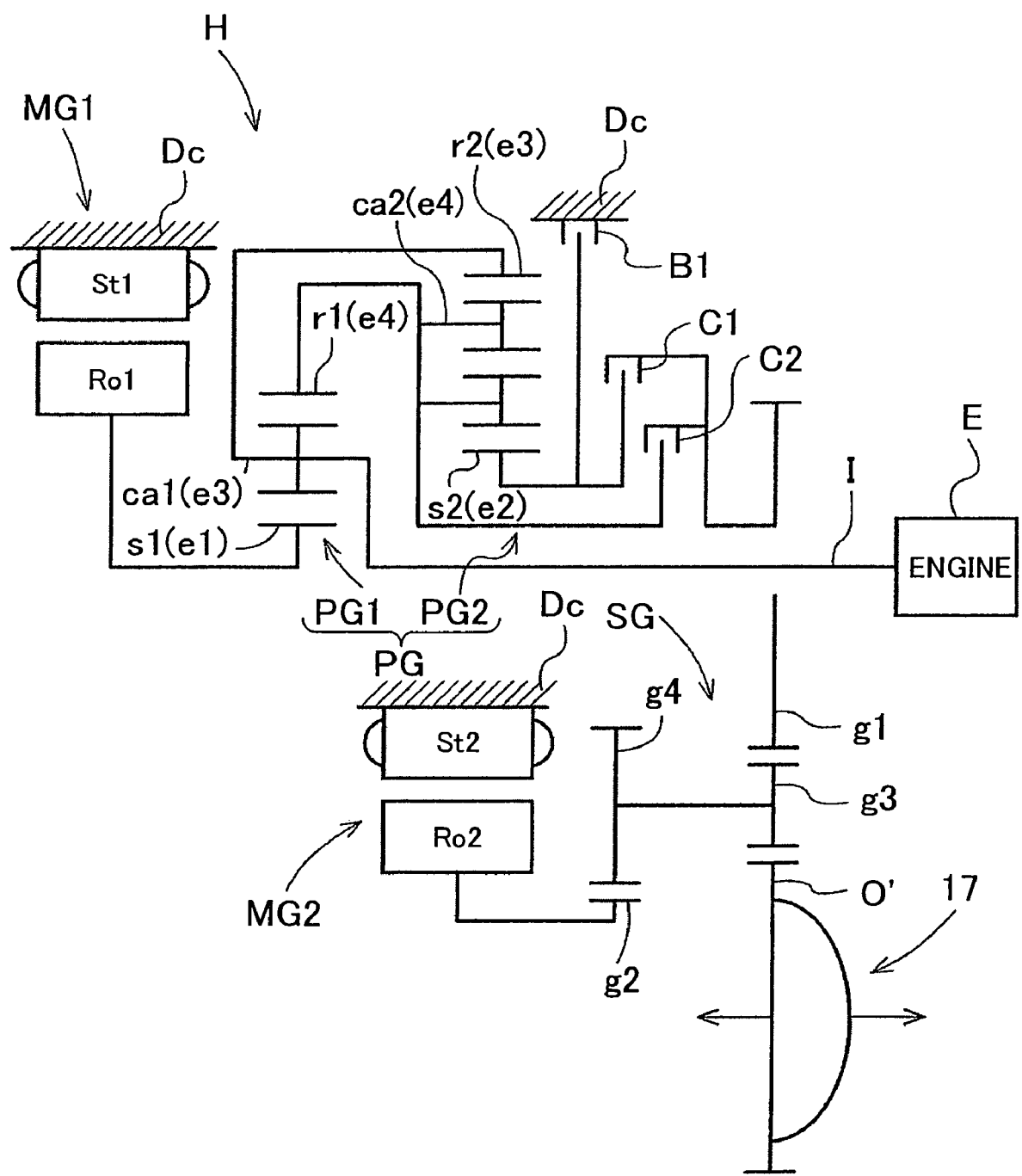
FIG. 16 is a skeleton diagram of a hybrid drive device according to a sixth embodiment of the present invention.

Next, a sixth embodiment of the present invention will be described. FIG. 16 is a skeleton diagram showing the configuration of the hybrid drive device H according to this embodiment. Note that the configuration of the lower half that is symmetrical with respect to the input shaft I is omitted in FIG. 16 in the same manner as in FIG. 14. The specific configuration of the planetary gear device PG as the differential gear device of the hybrid drive device H differs from those of the first to fifth embodiments described above. That is, in this embodiment, the planetary gear device PG is structured by combining the single-pinion type first planetary gear mechanism PG1 and the double-pinion type second planetary gear mechanism PG2. Note that, in this embodiment, the second motor generator MG2 is connected to the differential ring gear O' as the output member via the counter reduction gear mechanism SG in the same manner as in the fourth embodiment described above. Other configurations are the same as the configurations (including configurations of the first embodiment common with the fourth embodiment) of the fourth embodiment described above. Hereinafter, mainly the differences of the hybrid drive device H according to this embodiment from that of the fourth embodiment described above will be described.

6-1. Configuration of Differential Gear Device

As described above, in this embodiment, the planetary gear device PG as the differential gear device is structured by combining the first planetary gear mechanism PG1 and the second planetary gear mechanism PG2. The planetary gear device PG includes four rotational elements, and is structured such that the input shaft I, the output shaft O, and the first motor generator MG1 are respectively connected to different rotational elements, and the output shaft O can be selectively connected to one of the two rotational elements to which neither the input shaft I nor the first motor generator MG1 is connected. Hereinafter, the configuration of each of the planetary gear mechanisms PG1 and PG2 will be described in detail.

As shown in FIG. 16, the first planetary gear mechanism PG1 is a single-pinion type planetary gear mechanism arranged coaxially with the input shaft I. That is, the first planetary gear mechanism PG1 includes as the rotational elements the carrier ca1 supporting the plurality of pinion gears and the sun gear s1 and the ring gear r1 respectively meshing with the pinion gears. The sun gear s1 is connected to rotate integrally with the rotor Ro1 of the first motor generator MG1. The carrier ca1 is connected to rotate integrally with the ring gear r2 of the second planetary gear mechanism PG2 and the input shaft I. The ring gear r1 is connected to rotate integrally with the carrier ca2 of the second planetary gear mechanism PG2, and is selectively connected to the differential output gear g1 via the second clutch C2.

The second planetary gear mechanism PG2 is a double-pinion type planetary gear mechanism arranged coaxially with the input shaft I. That is, the second planetary gear mechanism PG2 includes as the rotational elements the carrier ca2 supporting a plurality of pinion gear pairs, the sun gear s2 meshing with one pinion gear that forms the pinion gear pair, and the ring gear r2 meshing with the other pinion gear. The sun gear s2 is selectively connected to the differential output gear g1 via the first clutch C1, and is selectively fixed to the case Dc by the first brake B1. The carrier ca2 is connected to rotate integrally with the ring gear r1 of the first planetary gear mechanism PG1, and is selectively connected to the differential output gear g1 via the second clutch C2. The ring gear r2 is connected to rotate integrally with the carrier ca1 of the first planetary gear mechanism PG1 and the input shaft I.

The planetary gear device PG is structured to include and integrally operate a total of four rotational elements by connecting two of three rotational elements included respectively in the first planetary gear mechanism PG1 and the second planetary gear mechanism PG2 to rotate integrally with each other. The four rotational elements are the first rotational element e1, the second rotational element e2, the third rotational element e3, and the fourth rotational element e4 in order of the rotational speed. In this embodiment, the sun gear s1 of the first planetary gear mechanism PG1 corresponds to the first rotational element e1 of the planetary gear device PG. The sun gear s2 of the second planetary gear mechanism PG2 corresponds to the second rotational element e2 of the planetary gear device PG. The carrier ca1 of the first planetary gear mechanism PG1 and the ring gear r2 of the second planetary gear mechanism PG2 which rotate integrally with each other correspond to the third rotational element e3 of the planetary gear device PG. The ring gear r1 of the first planetary gear mechanism PG1 and the carrier ca2 of the second planetary gear mechanism PG2 which rotate integrally with each other correspond to the fourth rotational element e4 of the planetary gear device PG.

Thus, the rotor Ro1 of the first motor generator MG1 is connected to rotate integrally with the first rotational element e1 of the planetary gear device PG, and the input shaft I is connected to rotate integrally with the third rotational element e3 of the planetary gear device PG. The output shaft O is structured to be selectively connected to the second rotational element e2 of the planetary gear device PG by the first clutch C1 and selectively connected to the fourth rotational element e4 of the planetary gear device PG by the second clutch C2, thereby being capable of selectively connecting to one of the second rotational element e2 and the fourth rotational element e4 of the planetary gear device PG. The output shaft O can be simultaneously connected to both of the second rotational element e2 and the fourth rotational element e4 of the planetary gear device PG by engaging both of the first clutch C1 and the second clutch C2. Further, the output shaft O can be simultaneously separated from both of the second rotational element e2 and the fourth rotational element e4 of the planetary gear device PG by releasing both of the first clutch C1 and the second clutch C2. Note that the second rotational element e2 of the planetary gear device PG is selectively fixed to the case Dc by the first brake B1 as described above.

Note that, as shown in FIG. 16, the rotational elements of the planetary gear device PG which rotate integrally with the input shaft I are the carrier ca1 of the first planetary gear mechanism PG1 and the ring gear r2 of the second planetary gear mechanism PG2 in this embodiment. A member connecting the carrier ca1 and the ring gear r2 is arranged on the outer circumference side of the planetary gear device PG. Thus, auxiliary devices, e.g., an oil pump, driven by the rotational driving force of the input shaft I can be easily arranged on the outer circumference of the planetary gear device PG. Therefore, with the hybrid drive device H according to this embodiment, the arrangement of the auxiliary devices becomes easy, whereby the space in an engine room or the like of the vehicle can be used effectively.

6-2. Operation Mode of Hybrid Drive Device

The hybrid drive device H according to this embodiment includes five modes of the torque converter mode, the direct connection mode, the torque split mode, the parallel acceleration mode, and the series mode to be switchable by switching the engagement and release of the first clutch C1, the second clutch C2, and the first brake B1 in the same manner as in the fourth embodiment described above. The operation table of the respective friction engagement elements C1, C2, and B1 in the respective operation modes is the same as FIG. 3 according to the first embodiment described above. The operation states of the planetary gear device PG in the respective operation modes are the same as the operation states shown in the velocity diagrams shown in FIGS. 4 to 8 according to the first embodiment described above. Note that, in this embodiment, as described above, the specific configurations of the first rotational element e1, the second rotational element e2, the third rotational element e3, and the fourth rotational element e4 differ from those of the first embodiment (and the fourth embodiment) described above. Thus, the specific contents of the respective rotational elements corresponding to the respective vertical lines are changed also in the velocity diagrams shown in FIGS. 4 to 8. That is, when FIGS. 4 to 8 are applied to this embodiment, "s1" of the sun gear s1 of the first planetary gear mechanism PG1 corresponding to the first rotational element e1, "s2" of the second sun gear s2 of the second planetary gear mechanism PG2 corresponding to the second rotational element e2, "ca1" of the carrier ca1 of the first planetary gear mechanism PG1 and "r2" of the ring gear r2 of the second planetary gear mechanism PG2 corresponding to the third rotational element e3, and "r1" of the ring gear r1 of the first planetary gear mechanism PG1 and "ca2" of the carrier ca2 of the second planetary gear mechanism PG2 corresponding to the fourth rotational element e4 are to be stated respectively in order from the vertical line on the left side on the upper side of the four vertical lines in the respective velocity diagrams.

7. Other Embodiments (1) In the respective embodiments described above, the configuration of the hybrid drive device H including five modes of the torque converter mode, the direct connection mode, the torque split mode, the parallel acceleration mode, and the series mode to be switchable has been described. However, embodiments of the present invention are not limited thereto, and a configuration further including other modes to be switchable in addition to the five modes described above is also preferable. A configuration in which the hybrid drive device H includes only a part of the five modes described above to be switchable is also preferable. For example, a configuration in which three modes of the torque converter mode, the direct connection mode, and the torque split mode are included to be switchable, or a configuration in which two modes of the torque converter mode and the torque split mode are included to be switchable in the hybrid drive device H is also one preferred embodiment of the present invention.

(2) In all of the respective embodiments described above, the configuration in which the second rotational element e2 of the planetary gear device PG that forms the differential gear device is selectively fixed to the case Dc as the non-rotation member by the first brake B1 has been described as an example. However, embodiments of the present invention are not limited thereto, and a configuration in which the first brake B1 that fixes the second rotational element e2 of the planetary gear device PG to the case Dc is not included is also one preferred embodiment of the present invention. Note that, in this case, the configuration of the hybrid drive device H does not allow two modes of the parallel acceleration mode and the series mode to be realized.

(3) In all of the respective embodiments described above, the case where the differential gear device is structured by the planetary gear device PG has been described as an example. However, the configuration of the differential gear device in the present invention is not limited to the planetary gear device PG. Thus, structuring the differential gear device using a gear mechanism of another form, e.g., a configuration in which a plurality of bevel gears are combined, is also one preferred embodiment of the present invention.

(4) The specific configurations of the differential gear device and the arrangement configurations of the friction engagement elements with respect to the respective rotational elements of the differential gear device described in the respective embodiments described above are only exemplary, and all configurations, other than the configurations described above, capable of realizing the configuration of the present invention are also included in the scope of the present invention.

(5) The specific configurations of the gear mechanism formed of the speed change mechanism TM and the reduction gear mechanism RG or SG described in the respective embodiments described above are only exemplary, and a configuration in which the second motor generator MG2 as the second rotating electrical machine is connected to the output member via a gear mechanism having a configuration other than that described above is also included in the scope of the present invention. In the hybrid drive device H including the configuration of the various differential gear devices described above, a configuration in which the second motor generator MG2 is directly connected to the output member without involving the gear mechanism in the same manner as in the third embodiment described above is also included in the scope of the present invention.

The present invention can be preferably used for a hybrid vehicle including an engine and two rotating electrical machines as drive power sources.

Note that, in the present invention, a "connection" includes a structure in which the transmission of rotation is performed directly, and also includes a structure in which the transmission of rotation is performed indirectly via one or more members. In the present invention, the "rotating electrical machine" is used as a concept including all of a motor (electric motor), a generator (electric generator), and a motor generator, which serves a function of both of the motor, and the generator if necessary. In addition, in the present invention, "order of rotational speed" means one of the order from the high-speed side to the low-speed side and the order from the low-speed side to the high-speed side. It may be either one depending on the rotation state of the differential gear device, but the order of the rotational elements does not change in either case.

According to an exemplary aspect of the invention, the output member is selectively connected to one of the two rotational elements of the differential gear device, whereby at least two modes can be included to be switchable. In either one of the respective modes, the second rotating electrical machine is connected to the output member, and therefore can always perform transmission of the rotational driving force without involving the differential gear device between the second rotating electrical machine and the output member. Therefore, for example, the rotational driving force of the output member can be transmitted directly to the second rotating electrical machine to cause electricity generation during regenerative braking, and the rotational driving force generated by the second rotating electrical machine can directly be transmitted to the output member to drive the vehicle when driving on electric power. Thus, when driving without requiring the driving force of the engine, it becomes possible not to rotate the input member by the rotational driving force transmitted between the second rotating electrical machine and the output member, whereby the energy loss due to friction resistance inside the engine can be suppressed. Thus, the energy efficiency of the device can be improved.

According to an exemplary aspect of the invention, the output member is selectively connected to one of the two rotational elements of the differential gear device, whereby the torque converter mode of transmitting to the output member the rotational driving force amplified with respect to the rotational driving force of the input member and the torque split mode of transmitting to the output member the rotational driving force attenuated with respect to the rotational driving force of the input member are switchable. Thus, it can be switched to an appropriate mode to drive the vehicle efficiently depending on the driving state of the vehicle.

According to an exemplary aspect of the invention, in addition to the two modes realized by selectively connecting the output member to one of the two rotational elements of the differential gear device, the direct connection mode in which the input member, the output member, and the first rotating electrical machine rotate at the same speed can further be included to be switchable without adding a new mechanical configuration. Thus, a mode switchable depending on the driving state of the vehicle can be increased, whereby the vehicle can be driven further efficiently.

According to an exemplary aspect of the invention, switching between the state where the output member is connected to one of the two rotational elements of the differential gear device (for example, the torque converter mode) and the state where the output member is connected the other one of the two rotational elements of the differential gear device (for example, the torque split mode) can be a synchronous switching in which there is almost no impact due to the engagement of friction engagement element and the like for connecting the output member to the rotational elements of the differential gear device.

According to an exemplary aspect of the invention, in a driving state where the driving load of the vehicle is small such as during high-speed driving, the rotational driving force of the engine can be transmitted to the output member for driving by switching to the parallel acceleration mode without requiring the operation of the first and second rotating electrical machines. Thus, the energy loss due to the operation of the first and second rotating electrical machines in the driving state where the driving load of the vehicle is small can be suppressed. Further, at this time, the rotational speed of the input member, i.e., of the engine, is increased to be transmitted to the output member, whereby the rotational speed of the engine can be kept low. Thus, the energy efficiency of the device can further be improved.

According to an exemplary aspect of the invention, the input member as well as the first rotating electrical machine and the output member as well as the second rotating electrical machine can be operated independently. Thus, it is possible to transmit the rotational driving force of the input member (engine) to the first rotating electrical machine to cause electricity generation, cause the second rotating electrical machine to perform power running by the generated electric power, and transmit the rotational driving force thereof to the output member to drive the vehicle. Thus, even in a state where the electric storage amount of an electric storage device such as a battery or capacitor is small, only the rotational driving force of the second rotating electrical machine can be transmitted to the output member for driving over a long period of time.

According to an exemplary aspect of the invention, the output member is selectively connected to one of the second rotational element and the fourth rotational element of the differential gear device, whereby the mode (torque converter mode) of transmitting to the output member the rotational driving force amplified with respect to the rotational driving force of the input member and the mode (torque split mode) of transmitting to the output member the rotational driving force attenuated with respect to the rotational driving force of the input member can be included to be switchable. Thus, the mode can be switched to an appropriate mode to drive the vehicle efficiently depending on the driving state of the vehicle. In either one of the respective modes, the second rotating electrical machine is connected to the output member, and therefore can always perform transmission of the rotational driving force without involving the differential gear device between the second rotating electrical machine and the output member. Therefore, for example, the rotational driving force of the output member can be transmitted directly to the second rotating electrical machine to cause electricity generation during regenerative braking, and the rotational driving force generated by the second rotating electrical machine can directly be transmitted to the output member to drive the vehicle when driving on electric power. Thus, when driving without requiring the driving force of the engine, it becomes possible not to rotate the input member by the rotational driving force transmitted between the second rotating electrical machine and the output member, whereby the energy loss due to friction resistance inside the engine can be suppressed. Thus, the energy efficiency of the device can be improved.

According to an exemplary aspect of the invention, the output member is simultaneously connected to both of the second rotational element and the fourth rotational element, whereby all of the rotational elements of the differential gear device can be rotated at the same speed. Thus, the direct connection mode in which the input member, the output member, and the first rotating electrical machine rotate at the same speed can be realized.

According to an exemplary aspect of the invention, the second rotational element is fixed to the non-rotation member by the brake and the output member is connected to the fourth rotational element, whereby the parallel acceleration mode can be realized in which the rotational speeds of the first rotating electrical machine and the output member are determined in proportion to the rotational speed of the input member, which increases the rotational speed of the input member to be transmitted to the output member.

According to an exemplary aspect of the invention, the output member is simultaneously separated from both of the second rotational element and the fourth rotational element, whereby the series mode can be realized in which the transmission of the rotational driving force is not performed between the input member as well as the first rotating electrical machine and the output member as well as the second rotating electrical machine.

According to an exemplary aspect of the invention, in the case where a clutch is provided for selectively connecting the output member to one of the second rotational element and the fourth rotational element of the differential gear device, the clutch can easily be arranged on the outer circumference side of the differential gear device. Thus, the entire length of the device can be shortened.

Note that, in the present invention, regarding the "planetary gear mechanism" including the three rotational elements of the sun gear, the carrier, and the ring gear, a device obtained by the planetary gear mechanism alone or by combining a plurality of such planetary gear mechanisms is called the "planetary gear device."

According to an exemplary aspect of the invention, the number of parts of the differential gear device can be reduced, and the entire length of the differential gear device can be shortened.

According to an exemplary aspect of the invention, the rotational element, which rotates integrally with the input member, is arranged on the outer circumference of the differential gear device, whereby auxiliary devices such as an oil pump driven by the rotational driving force of the input member can be arranged on the outer circumference side of the differential gear device. Thus, the arrangement of the auxiliary devices becomes easy, and the limited space for device arrangement can be used effectively.

According to an exemplary aspect of the invention, in the case where the rotational driving force of the second rotating electrical machine is not necessary, the second rotating electrical machine can be separated from the output member. Thus, the energy loss caused by the second rotating electrical machine being rotated by the rotational driving force of the output member can be suppressed. Thus, the energy efficiency of the device can further be improved.

Note that, in all of the configurations described above, the second rotating electrical machine may be connected to the output member directly or via a gear mechanism.

According to an exemplary aspect of the invention, the rotational driving force of the second rotating electrical machine can be reduced at a predetermined speed reduction ratio to be transmitted to the output member, or shifted at a plurality of transmission ratios to be transmitted to the output member. Thus, it is possible to achieve size reduction of the second rotating electrical machine while satisfying the needs on the vehicle side regarding the magnitude of the rotational driving force to be transmitted to the output member.

According to an exemplary aspect of the invention, the rotational driving force of the second rotating electrical machine can be reduced at least two different speed reduction ratios to be transmitted to the output member. By releasing the brakes of both of the third rotational element and the fourth rotational element of the speed change mechanism, the second rotating electrical machine can be separated from the output member.

What is claimed is:

1. A hybrid drive device, comprising:
an input member connected to an engine;
an output member connected to a wheel;
a first rotating electrical machine;
a second rotating electrical machine connected to the output member; and
a differential gear device including at least four rotational elements, wherein:
the input member, the output member, and the first rotating electrical machine are respectively connected to different rotational elements of the differential gear device,
the output member is capable of selectively connecting to one of two rotational elements of the differential gear device to which neither the input member nor the first rotating electrical machine is connected,
the output member is structured to be capable of connecting to both of the two rotational elements of the differential gear device, and
when the output member is connected to both of the two rotational elements of the differential gear device, a direct connection mode is created in which the input member, the output member, and the first rotating electrical machine rotate at identical speeds.

2. The hybrid drive device according to claim 1, wherein:
when the output member is connected to one of the two rotational elements of the differential gear device, a torque converter mode is created where a rotational driving force amplified with respect to a rotational driving force of the input member is transmitted to the output member; and
when the output member is connected to another one of the two rotational elements of the differential gear device, a torque split mode is created where a rotational driving force attenuated with respect to the rotational driving force of the input member is transmitted to the output member.

3. The hybrid drive device according to claim 2, wherein the direct connection mode is realized by connecting the output member to both of the two rotational elements of the differential gear device in a state where rotational speeds of the two rotational elements of the differential gear device are identical, when switching between a state where the output member is connected to one of the two rotational elements of the differential gear device and a state where the output member is connected to the another one of the two rotational elements of the differential gear device.

4. The hybrid drive device according claim 3, wherein, when the output member is connected to one of the two rotational elements of the differential gear device, and the another one of the two rotational elements of the differential gear device is selectively fixed to a non-rotation member, a parallel acceleration mode is created in which rotational speeds of the first rotating electrical machine and the output member are determined in proportion to a rotational speed of the input member whereby the rotational speed of the input member is increased to be transmitted to the output member.

5. The hybrid drive device according to claim 4, wherein:
the output member is structured to be capable of separating from both of the two rotational elements of the differential gear device, and
when the output member is separated from both of the two rotational elements of the differential gear device, a series mode is created in which transmission of rotational driving force is not performed between the input member as well as the first rotating electrical machine and the output member as well as the second rotating electrical machine.

6. The hybrid drive device according to claim 5, wherein the second rotating electrical machine is capable of selectively separating from the output member.

7. The hybrid drive device according to claim 5, wherein the second rotating electrical machine is connected to the output member directly or via a gear mechanism.

8. The hybrid drive device according to claim 5, wherein:
the second rotating electrical machine is connected to the output member via a gear mechanism, and
the gear mechanism is a reduction gear mechanism or a speed change mechanism having a plurality of shift speeds.

9. The hybrid drive device according to claim 8, wherein
the speed change mechanism includes a first rotational element, a second rotational element, a third rotational element, and a fourth rotational element; and
the second rotating electrical machine is connected to the first rotational element of the speed change mechanism, the output member is connected to the second rotational element of the speed change mechanism, and the third rotational element and the fourth rotational element of the speed change mechanism are selectively fixed respectively to a non-rotation member by a brake.

10. The hybrid drive device according to claim 1, wherein:
the differential gear device is structured by a Ravigneaux-type planetary gear device including a first sun gear, a second sun gear, a carrier, and a ring gear; and
the first rotational element is structured by the first sun gear, the second rotational element is structured by the carrier, the third rotational element is structured by the ring gear, and the fourth rotational element is structured by the second sun gear.

11. The hybrid drive device according to claim 1, wherein:
the differential gear device is structured by a single-pinion type first planetary gear mechanism and a double-pinion type second planetary gear mechanism respectively including a sun gear, a carrier, and a ring gear; and
the first rotational element is structured by the sun gear of the first planetary gear mechanism, the second rotational element is structured by the sun gear of the second planetary gear mechanism, the third rotational element is structured by the carrier of the first planetary gear mechanism and the ring gear of the second planetary gear mechanism which are connected to rotate integrally with each other, and the fourth rotational element is structured by the ring gear of the first planetary gear mechanism and the carrier of the second planetary gear mechanism which are connected to rotate integrally with each other.

12. The hybrid drive device according to claim 1, wherein:
the output member is structured to be capable of separating from both of the two rotational elements of the differential gear device, and
when the output member is separated from both of the two rotational elements of the differential gear device, a series mode is created in which transmission of rotational driving force is not performed between the input member as well as the first rotating electrical machine and the output member as well as the second rotating electrical machine.

13. The hybrid drive device according to claim 1, wherein the second rotating electrical machine is capable of selectively separating from the output member.

14. The hybrid drive device according to claim 1, wherein the second rotating electrical machine is connected to the output member directly or via a gear mechanism.

15. A hybrid drive device, comprising:
an input member connected to an engine;
an output member connected to a wheel;
an first rotating electrical machine;
a second rotating electrical machine connected to the output member; and
a differential gear device including at least four rotational elements, wherein:
the input member, the output member, and the first rotating electrical machine are respectively connected to different rotational elements of the differential gear device,
the output member is capable of selectively connecting to one of two rotational elements of the differential gear device to which neither the input member nor the first rotating electrical machine is connected, and
in the state where the output member is connected to one of the two rotational elements of the differential gear device, another one of the two rotational elements of the differential gear device is selectively fixed to a non-rotation member, and that fixed state causes a parallel acceleration mode in which rotational speeds of the first rotating electrical machine and the output member are determined in proportion to a rotational speed of the input member whereby the rotational speed of the input member is increased to be transmitted to the output member.

16. A hybrid drive device, comprising:
an input member connected to an engine;
an output member connected to a wheel;
a first rotating electrical machine;
a second rotating electrical machine connected to the output member; and
a differential gear device that includes a first rotational element, a second rotational element, a third rotational element, and a fourth rotational element, wherein:
the first rotating electrical machine is connected to the first rotational element, the input member is connected to the third rotational element, and the output member is capable of selectively connecting to one of the second rotational element and the fourth rotational element,
the output member is capable of being simultaneously connected to both of the second rotational element and the fourth rotational element,
the output member is selectively connected to the second rotational element by a first clutch, and selectively connected to the fourth rotational element by a second clutch, and
the second rotational element is selectively fixed to a non-rotation member by a brake.

17. The hybrid drive device according to claim 16, wherein the output member is capable of being simultaneously separated from both of the second rotational element and the fourth rotational element.

18. The hybrid drive device according to claim 17, wherein:
the differential gear device is structured by a single-pinion type first planetary gear mechanism and a single-pinion type second planetary gear mechanism respectively including a sun gear, a carrier, and a ring gear; and
the first rotational element is structured by the sun gear of the first planetary gear mechanism and the sun gear of the second planetary gear mechanism which are connected to rotate integrally with each other, the second rotational element is structured by the carrier of the first planetary gear mechanism, the third rotational element is structured by the ring gear of the first planetary gear mechanism and the carrier of the second planetary gear mechanism which are connected to rotate integrally with each other, and the fourth rotational element is structured by the ring gear of the second planetary gear mechanism.

19. The hybrid drive device according to claim 18, wherein the second rotating electrical machine is capable of selectively separating from the output member.

20. The hybrid drive device according to claim 18, wherein the second rotating electrical machine is connected to the output member directly or via a gear mechanism.

21. The hybrid drive device according to claim 18, wherein:
the second rotating electrical machine is connected to the output member via a gear mechanism, and
the gear mechanism is a reduction gear mechanism or a speed change mechanism having a plurality of shift speeds.

22. The hybrid drive device according to claim 21, wherein:
the speed change mechanism includes a first rotational element, a second rotational element, a third rotational element, and a fourth rotational element in order of rotational speed; and
the second rotating electrical machine is connected to the first rotational element of the speed change mechanism, the output member is connected to the second rotational element of the speed change mechanism, and the third rotational element and the fourth rotational element of the speed change mechanism are selectively fixed respectively to a non-rotation member by a brake.

23. The hybrid drive device according to claim 16, wherein:
the differential gear device is structured by a single-pinion type first planetary gear mechanism and a single-pinion type second planetary gear mechanism respectively including a sun gear, a carrier, and a ring gear; and
the first rotational element is structured by the sun gear of the first planetary gear mechanism and the sun gear of the second planetary gear mechanism which are connected to rotate integrally with each other, the second rotational element is structured by the carrier of the first planetary gear mechanism, the third rotational element is structured by the ring gear of the first planetary gear mechanism and the carrier of the second planetary gear mechanism which are connected to rotate integrally with each other, and the fourth rotational element is structured by the ring gear of the second planetary gear mechanism.

24. The hybrid drive device according to claim 16, wherein:
the differential gear device is structured by a Ravigneaux-type planetary gear device including a first sun gear, a second sun gear, a carrier, and a ring gear; and
the first rotational element is structured by the first sun gear, the second rotational element is structured by the carrier, the third rotational element is structured by the ring gear, and the fourth rotational element is structured by the second sun gear.

25. The hybrid drive device according to claim 16, wherein:
the differential gear device is structured by a single-pinion type first planetary gear mechanism and a double-pinion type second planetary gear mechanism respectively including a sun gear, a carrier, and a ring gear; and
the first rotational element is structured by the sun gear of the first planetary gear mechanism, the second rotational element is structured by the sun gear of the second planetary gear mechanism, the third rotational element is structured by the carrier of the first planetary gear mechanism and the ring gear of the second planetary gear mechanism which are connected to rotate integrally with each other, and the fourth rotational element is structured by the ring gear of the first planetary gear mechanism and the carrier of the second planetary gear mechanism which are connected to rotate integrally with each other.

26. The hybrid drive device according to claim 16, wherein the second rotating electrical machine is capable of selectively separating from the output member.

27. The hybrid drive device according to claim 16, wherein the second rotating electrical machine is connected to the output member directly or via a gear mechanism.

* * * * *